US008498313B2

(12) United States Patent
Sambhwani et al.

(10) Patent No.: US 8,498,313 B2
(45) Date of Patent: Jul. 30, 2013

(54) FAST UPLINK DATA TRANSMISSION USING E-DCH ENHANCED RANDOM ACCESS WITHOUT A UE SPECIFIC E-RNTI

(75) Inventors: Sharad Deepak Sambhwani, San Diego, CA (US); Rohit Kapoor, San Diego, CA (US); Yih-Hao Lin, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 682 days.

(21) Appl. No.: 12/603,403

(22) Filed: Oct. 21, 2009

(65) Prior Publication Data

US 2010/0135251 A1    Jun. 3, 2010

Related U.S. Application Data

(60) Provisional application No. 61/107,978, filed on Oct. 23, 2008, provisional application No. 61/111,245, filed on Nov. 4, 2008.

(51) Int. Cl.
*H04L 12/413* (2006.01)

(52) U.S. Cl.
USPC ............................ 370/474; 370/312; 370/438

(58) Field of Classification Search
USPC .................................. 370/312, 349, 438, 474
See application file for complete search history.

(56) References Cited

U.S. PATENT DOCUMENTS

| 7,406,314 | B2 | 7/2008 | Sharma | |
| 7,440,776 | B2 * | 10/2008 | Kikuchi | 455/560 |
| 7,551,643 | B2 * | 6/2009 | Yeo et al. | 370/469 |
| 2003/0003895 | A1 * | 1/2003 | Wallentin et al. | 455/410 |
| 2004/0146067 | A1 * | 7/2004 | Yi et al. | 370/474 |
| 2007/0201436 | A1 * | 8/2007 | Kim et al. | 370/352 |
| 2008/0188220 | A1 | 8/2008 | DiGirolamo et al. | |
| 2010/0222023 | A1 * | 9/2010 | Aoyama et al. | 455/411 |
| 2011/0032889 | A1 * | 2/2011 | Lee et al. | 370/329 |

FOREIGN PATENT DOCUMENTS

WO    2007077840 A1    7/2007

OTHER PUBLICATIONS

International Search Report and Written Opinion—PCT/US2009/061931—International Search Authority—European Patent Office, Apr. 8, 2010.
LG Electronics: "Discussion on Early Transmission of IDT; R2-061317," 3GPP TSG RAN, vol. RAN WG2, May 4, 2006, pp. 1-8, XP050131258, section 2.8.
Qualcomm Europe: "Concatenation of CCCH/DTCH in URA_PCH; R2-086365," 3GPP TSG RAN, Nov. 4, 2008, pp. 1-3, XP050321343.

(Continued)

*Primary Examiner* — Phuc Tran
(74) *Attorney, Agent, or Firm* — D. Scott Juneau

(57) ABSTRACT

Systems and methodologies are described that facilitate communicating user plane data over common control resources by specifying a user equipment (UE) radio network temporary identifier (U-RNTI). In this regard, a Node B or radio network controller (RNC) receiving the user plane data can associate the data to the UE based on the U-RNTI. The user plane data can be transmitted in a control message with the associated U-RNTI, such as a CELL UPDATE message or another message having the U-RNTI specified in a media access control (MAC)-i header or other header in the message. The control message can also include parameters regarding the existence and specifications of the user plane data. The UE can thereby communicate the user plane data while in a universal terrestrial radio access network (UTRAN) registration area paging channel (URA_PCH) or other relatively inactive state despite not having received an enhanced radio network temporary identifier (E-RNTI).

59 Claims, 15 Drawing Sheets

OTHER PUBLICATIONS

Qualcomm Europe: "Concatenation of CCCH/DTCH in URA_PCH; R2-086366," 3GPP TSG RAN, Nov. 4, 2008, pp. 1-5, XP050321344.

"Universal Mobile Telecommunications System (UMTS); Medium Access Control (MAC) Protocol Specification (3GPP TS 25.321 Version 8.3.0 Release 8); ETSI TS 125 321," ETSI Standard, European Telecommunications Standards Institute (ETSI), Sep. 23, 2008, pp. I, 1-171, XP014042517, section 9.2.4.4, section 11.8.2.5.

"Universal Mobile Telecommunications System (UMTS); Radio Resource Control (RRC); Protocol Specification (3GPP TS 25.331, Version 8.4.0 Release 8); ETSI TS 125 331 V8.4.0," ETSI Standard, European Telecommunications Standards Institute (ETSI), Sep. 23, 2008, p. I, 478-484, XP002572696, Sections 10.2.7 and 10.2.8.

Vodafone Group: "Low Latency User Plane Establishment," 3GPP TSG RAN, Mar. 23, 2006, pp. 1-5, XP050130891, R2-060962, section 4.

Taiwan Search Report—TW098136015—TIPO—Mar. 25, 2013.

* cited by examiner

FAST UPLINK DATA TRANSMISSION USING E-DCH ENHANCED RANDOM ACCESS WITHOUT A UE SPECIFIC E-RNTI

CROSS-REFERENCE

This application claims the benefit of U.S. Provisional Application Ser. No. 61/107,978, filed Oct. 23, 2008, and entitled "FAST UPLINK DATA TRANSMISSION USING E-DCH ENHANCED RANDOM ACCESS WITHOUT A UE SPECIFIC E-RNTI," and U.S. Provisional Application Ser. No. 61/111,245, filed Nov. 4, 2008, and entitled "FAST UPLINK DATA TRANSMISSION USING E-DCH ENHANCED RANDOM ACCESS WITHOUT A UE SPECIFIC E-RNTI," the entireties of which are incorporated herein by reference.

BACKGROUND

I. Field

The present disclosure relates generally to wireless communications and more specifically to enhanced uplink (EUL) communications.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc., and can use one or more protocols, such as high-speed downlink packet access (HSDPA), single carrier HSDPA (SC-HSDPA), dual carrier HSDPA (DC-HSDPA), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

In some 3GPP releases, mobile devices utilize enhanced uplink (EUL) in communicating with access points for increased efficiency and capability. In this regard, mobile devices can select/reselect cells by transmitting radio resource control (RRC) connection setup requests to related access points, receiving common enhanced dedicated channel (E-DCH) resources from the access points, and utilizing the E-DCH resources to communicate to the access points within the cells. Access points can additionally provide an enhanced radio network temporary identifier (E-RNTI) to the devices along with the E-DCH resources, and the devices can specify the E-RNTI in subsequent communications to facilitate identification.

EUL additionally provides enhanced random access in connected mode where upon receiving E-DCH resources from an access point (such as a dedicated control channel (DCCH)), a mobile device can communicate general data over the control resources without first setting up a traffic channel. To facilitate such communication, the mobile device can specify the received E-RNTI within the general data sent over the resources. This allows the access point to identify the mobile device and associate the general data communication therewith. Additionally, to facilitate efficient mobility, mobile devices can travel over a service area in one or more connected mode states, such as cell forward link access channel (CELL_FACH), cell dedicated channel (CELL_DCH), cell paging channel (CELL_PCH), and universal terrestrial radio access network (UTRAN) registration area paging channel (URA_PCH), each having different procedures with respect to maintaining connection to the access point or underlying wireless network.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating communicating user equipment (UE) specific data over common control resources by specifying a UE radio network temporary identifier (U-RNTI) along with the data. A receiving access point (e.g., enhanced Node B (eNB) or other Node B) can identify the UE according to the U-RNTI and communicate the data to its radio network controller (RNC), or other network component, specifying the U-RNTI. In one example, the UE can transmit its U-RNTI to the eNB in a media access control (MAC)-i header (e.g., in a logical channel identifier field reserved for U-RNTI), and transmit data over the common control channel (CCCH) or common traffic channel (CTCH). In another example, the UE can transmit its U-RNTI to the eNB in a cell reselection message (such as CELL UPDATE), which can be transmitted over CCCH to indicate cell reselection to an RNC, along with data concatenated with the cell reselection message. Thus, UEs can communicate user plane data to eNBs without first acquiring traffic channel resources, or an eNB specific address, through CCCH communications by specifying a U-RNTI in association with the data communication.

According to related aspects, a method is provided that includes receiving user plane data for transmitting to a wireless network and generating a control message comprising the user plane data and a U-RNTI. The method also includes transmitting the control message over common control resources provided by a Node B.

Another aspect relates to a wireless communications apparatus. The wireless communications apparatus can include at least one processor configured to obtain user plane data for transmission to one or more components of a wireless network and create a control message comprising the user plane data and a U-RNTI for the wireless communications apparatus. The at least one processor is further configured to transmit the control message over common control resources provided by a Node B. The wireless communications apparatus also comprises a memory coupled to the at least one processor.

Yet another aspect relates to an apparatus. The apparatus includes means for receiving user plane data for transmitting over a wireless network and means for generating a control message that includes the user plane data. The apparatus further includes means for indicating a U-RNTI in the control message and means for communicating the control message over a set of common control resources provided by a Node B.

Still another aspect relates to a computer program product, which can have a computer-readable medium including code for causing at least one computer to receive user plane data for transmitting to a wireless network. The computer-readable medium can also comprise code for causing the at least one computer to generate a control message comprising the user plane data and a U-RNTI and code for causing the at least one computer to transmit the control message over common control resources provided by a Node B.

Moreover, an additional aspect relates to an apparatus including a user plane data component that receives user plane data for transmitting over a wireless network and a message generating component that creates a control message including the user plane data. The apparatus also includes a U-RNTI indicating component that specifies a U-RNTI in the control message and a control channel communicating component that transmits the control message over a set of common control resources provided by a Node B.

According to another aspect, a method is provided that includes receiving a control message over provided common control resources and determining that the control message comprises user plane data. The method also includes extracting a U-RNTI from the control message and transmitting the user plane data and U-RNTI to an RNC for processing.

Another aspect relates to a wireless communications apparatus. The wireless communications apparatus can include at least one processor configured to receive a control message from a UE over provided common control resources and detect presence of user plane data in the control message. The at least one processor is further configured to extract a U-RNTI related to the UE from the control message and transmit the user plane data and the U-RNTI to an RNC for subsequent processing. The wireless communications apparatus also comprises a memory coupled to the at least one processor.

Yet another aspect relates to an apparatus. The apparatus includes means for receiving a control message over common control resources and means for obtaining user plane data from the control message. The apparatus further includes means for extracting a U-RNTI from the control message and means for communicating the user plane data and the U-RNTI to an RNC.

Still another aspect relates to a computer program product, which can have a computer-readable medium including code for causing at least one computer to receive a control message over provided common control resources and code for causing the at least one computer to determine that the control message comprises user plane data. The computer-readable medium can also comprise code for causing the at least one computer to extract a U-RNTI from the control message and code for causing the at least one computer to transmit the user plane data and the U-RNTI to an RNC for processing.

Moreover, an additional aspect relates to an apparatus including a control data receiving component that obtains a control message over common control resources and a user plane determining component that extracts user plane data from the control message. The apparatus also includes a U-RNTI determining component that extracts a U-RNTI from the control message and a backhaul link component that transmits the user plane data and the U-RNTI to an RNC.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
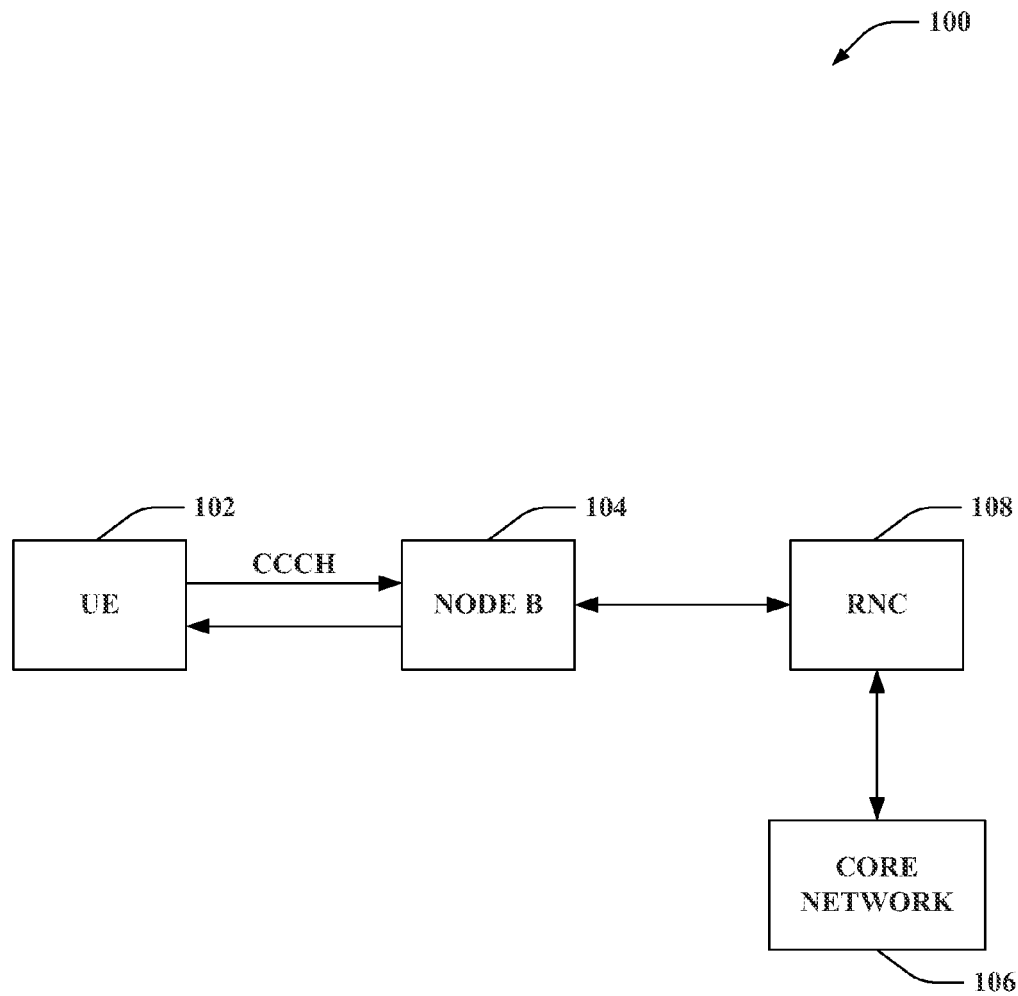
FIG. 1 is a block diagram of a system for communicating user plane data over common control resources without an enhanced radio network temporary identifier (E-RNTI).

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB) or other Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless network 100 that facilitates communicating data between UEs and Node Bs over common resources before receiving an enhanced dedicated channel (E-DCH) radio network temporary identifier (E-RNTI). System 100 includes a UE 102 that communicates with a Node B 104 to receive access to a core network 106. UE 102 can be substantially any sort of device that can communicate in a wireless network, such as a mobile device, access point, relay node, etc., receiving access to the wireless network from Node B 104. Node B 104 can be a macrocell access point, femtocell or picocell access point, relay node, device communicating in a peer-to-peer configuration, and/or the like, that provides wireless network access to UE 102 (and/or other devices). Node B 104 can communicate with an RNC 108 to obtain access to core network 106. The RNC 108 can manage one or more Node Bs providing network access thereto by establishing connections with the Node Bs and routing network packets.

According to an example, UE 102 can travel over a wireless network coverage area selecting/reselecting cells when within a specified or desired range. UE 102 can perform such selection/reselection in an idle or connected communication mode. When in a connected communications mode, UE 102 can operate in one or more connected mode states, such as cell forward link access channel (CELL_FACH), cell dedicated channel (CELL_DCH), cell paging channel (CELL_PCH), universal terrestrial radio access network (UTRAN) registration area (URA) paging channel (URA_PCH), etc. While CELL_FACH and CELL_DCH are active connected modes indicative of common or dedicated resources granted to the UE 102, CELL_PCH and URA_PCH are more passive or relatively inactive modes used to maintain some resources to stay connected while releasing others to facilitate power conservation.

UE 102 can also operate in an idle communication mode, where it can camp on various Node Bs in preparation for efficiently switching to a connected mode. To switch to a connected mode, UE 102 sends a radio resource control (RRC) connection setup message to a Node B, such as Node B 104, and receives a common resource assignment (common control channel (CCCH), etc.) or a dedicated resource assignment (e.g., dedicated control channel (DCCH), etc.). In either case, UE 102 can transition to a CELL_FACH or CELL_DCH state, respectively. The state change can be initiated and stored by the core network 106, for example. UE 102 can receive a subsequent access grant for a traffic channel as well (e.g., common traffic channel (CTCH), dedicated traffic channel (DTCH), and/or the like) from Node B 104. Subsequently, core network 106 can transition the UE 102 to a CELL_PCH or URA_PCH state (e.g., where an active connection is no longer needed, but idle mode is not yet desired). When in CELL_PCH or URA_PCH state, UE 102 can maintain RRC connection to Node B 104 or other Node Bs where reselected, along with CCCH resources.

When UE 102 is in a CELL_PCH state, RNC 108 maintains location information for UE 102 at the cell level, and the UE 102 can retain an E-RNTI assigned by the Node B 104 or other reselected Node B. Where UE 102 is in a URA_PCH state, however, location is only known to be within the URA, and not to a specific Node B; thus, in this case, UE 102 does not retain an E-RNTI. When in a CELL_FACH or CELL_PCH state, UE 102 can communicate general data to Node B 104 over the CCCH (e.g., without setting up a traffic channel) by including the E-RNTI in the communication, and the Node B 104 can associate the communication with the UE 102 according to the E-RNTI. The Node B 104 can forward the communication to the core network 106, through the RNC 108, indicating the E-RNTI. In this regard, response data from the core network 106 can be associated to the UE 102.

When the UE 102 is in a URA_PCH state, as described, it does not have an E-RNTI. In this case, UE 102 can communicate general user plane data (e.g., DCCH or DTCH data) to Node B 104 over the CCCH or a CTCH by specifying a UE radio network temporary identifier (U-RNTI) related to the UE 102 in the communication. For example, the RNC 108 can have assigned the U-RNTI to UE 102 when UE 102 had previously established communications therewith. In one example, UE 102 can specify the U-RNTI to Node B 104 in a media access control (MAC)-i header (e.g., in a logical channel identifier field) related to the communication. In another example, UE 102 can transmit a cell reselection update message to the Node B 104 over the CCCH, for forwarding to the core network 106, to facilitate transitioning to a CELL_FACH or CELL_DCH state (e.g., a CELL UPDATE message). UE 102 can append the user plane data communication to the cell reselection message, in one example.

Node B 104 can receive the CCCH communications from the UE 102. In the MAC-i header example, Node B 104 can extract the U-RNTI from the header and communicate the received user plane data to the core network 106. In the cell reselection message example, if user plane data is appended to the cell reselection message, RNC 108 can extract the U-RNTI from the cell reselection message along with the appended user plane data and communicate the user plane data to the core network 106. In either case, RNC 108 can additionally associate the U-RNTI with the user plane data before forwarding to the core network 106. In addition, RNC 108, in the cell reselection message example, can also forward the cell reselection message to the core network 106 for separate processing. In one example, RNC 108 can transition UE 102 to a CELL_FACH or CELL_DCH state based on the cell reselection message. In addition, for example, the core network 106 can respond to the UE 102 with respect to the user plane data in the same or different message as that acknowledging or completing the state transition. Thus, UE 102 can transmit DCCH or DTCH data from a URA_PCH state over CCCH without an E-RNTI.

Figure 2:
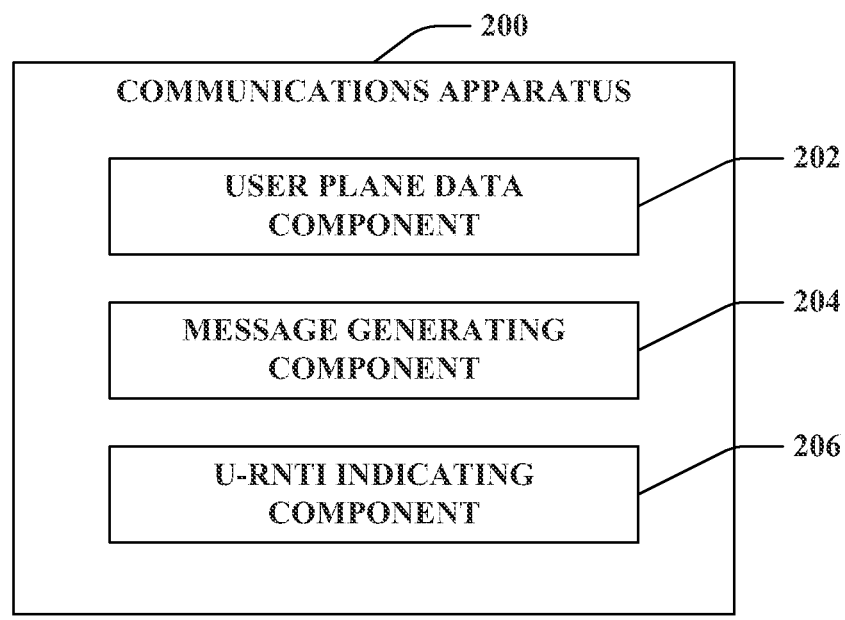
FIG. 2 is an illustration of an example communications apparatus for employment within a wireless communications environment.

Referring next to FIG. 2, a communications apparatus 200 that can participate in a wireless communications network is illustrated. The communications apparatus 200 can be a mobile device, access point, a portion thereof, or substantially any device that can provide or receive access to a wireless network. The communications apparatus 200 can include a user plane data component 202 that generates user plane data to communicate over control resources, a message generating component 204 that creates one or more control messages for transmitting user plane data over common control resources, and a U-RNTI indicating component 206 that specifies a U-RNTI associated with the communications apparatus 200 for subsequent user plane data communication.

According to an example, user plane data component 202 can receive user plane data to send to an access point in a wireless network. The data can be generated by another component of the communications apparatus 200, for example, based on a request from an operator of the communications apparatus 200 or otherwise. Message generating component 204 can create a control message to transmit the user plane data. In this regard, communications apparatus 200 can operate in a URA_PCH or other relatively inactive state and communicate user plane data over common control resources without having an E-RNTI.

In one example, message generating component 204 can create a general control data message that comprises or includes the user plane data. In another example, message generating component 204 creates a specific cell reselection message, such as a CELL UPDATE, and appends the user plane data to the message. It is to be appreciated that the message generating component 204 can additionally or alternatively include a Boolean indicator specifying presence of DTCH or DCCH data, a size of the data, as well as a logical channel identity for the data, for example. Moreover, the Boolean indicator can be optional such that its absence indicates that the cell reselection message does not comprise DTCH or DCCH data.

In either case, U-RNTI indicating component 206 can specify a U-RNTI related to the communications apparatus 200 for indication in the control data message. In one example, where a general control data message is utilized to communicate the user plane data, U-RNTI indicating component 206 can insert the U-RNTI in a MAC-i header related to the general control data message. For example, a logical channel identity in the MAC-i header can be reserved for communicating the U-RNTI, as described. Where a cell reselection message, such as CELL UPDATE, is transmitted, U-RNTI indicating component 206 can populate the U-RNTI field in the message with the U-RNTI of communications apparatus 200. In either case, communications apparatus 200 can communicate the message to a Node B (not shown) for providing user plane data over a common control channel, as described.

Figure 3:
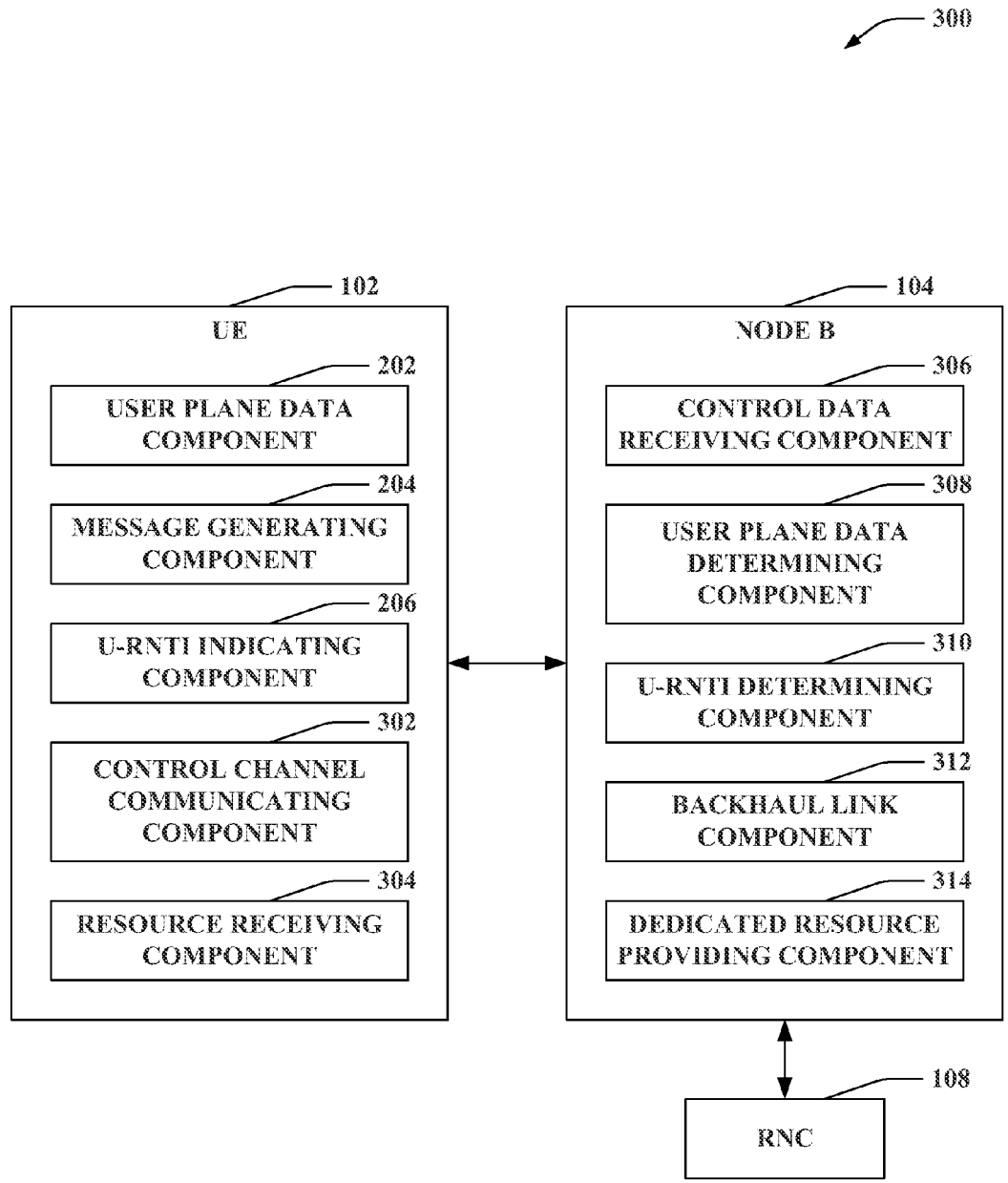
FIG. 3 illustrates an example wireless communication network that effectuates communicating user plane data over common control resources using a user equipment (UE) radio network temporary identifier (U-RNTI).

Now referring to FIG. 3, illustrated is a wireless communications system 300 that facilitates communicating user plane data over common control resources without an E-RNTI. System 300 includes a UE 102, which as described can be a mobile device or other device that receives wireless network access, and a Node B 104, which as described can be substantially any type of base station, macrocell, femtocell, or picocell access points, mobile device (including not only an independently powered device, but also a modem, for example), and/or the like, that provides wireless network access, and/or portion thereof. System 300 also includes an RNC 108 that can host a plurality of Node Bs, including Node B 104, to provide network access thereto. Moreover, system 300 can be a MIMO system and/or can conform to one or more wireless network system specifications (e.g., EV-DO, 3GPP, 3GPP2, 3GPP LTE, WiMAX, etc.). Moreover, UE 102 and/or Node B 104 can comprise additional components to facilitate wireless communications.

UE 102 can include a user plane data component 202 that receives user plane data for transmitting to one or more Node Bs, a message generating component 204 that creates a control message including the user plane data for transmission over common control resources, a U-RNTI indicating component 206 that inserts a U-RNTI in the control message, a control channel communicating component 302 that transmits control messages over common control resources, and a resource receiving component 304 that can receive a resource grant from one or more Node Bs for dedicated resources. Node B 104 includes a control data receiving component 306 that implements common control resources and obtains control messages transmitted thereover, a user plane data determining component 308 that discerns whether user plane data is transmitted in one or more control messages and extracts the user plane data, a U-RNTI determining component 310 that extracts a U-RNTI from one or more control messages that comprise user plane data, a backhaul link component 312 that communicates with the RNC 108 to provide wireless network access to one or more UEs, and a dedicated resource providing component 314 that grants dedicated traffic channel resources a UE.

According to an example, UE 102 can be connected to Node B 104 in a connected mode state, such as CELL_FACH, CELL_DCH, CELL_PCH, URA_PCH, etc. When in a CELL_FACH or CELL_PCH state, UE 102 can have an E-RNTI assigned by the Node B 104 and can include the E-RNTI when transmitting DTCH or DCCH data over a CCCH provided by the Node B 104. Thus, Node B 104 can identify the UE 102 based on the E-RNTI and accordingly process any included DTCH or DCCH data. In this example, user plane data component 202 can receive or otherwise define the DTCH or DCCH data, and message generating component 204 can include the user plane data in a CCCH message having the E-RNTI indicated in the MAC-i header, for example.

In another example, where the UE 102 is in a URA_PCH state, user plane data component 202 can receive or otherwise define user plane data for transmitting to the Node B 104. Message generating component 204 can create a control message for transporting the user plane data. This can be a new type of message or message generating component 204 can append user plane data to an existing message type. In either case, for example, U-RNTI indicating component 206 can specify a U-RNTI related to the UE 102, which is defined by a core network (not shown) and can have been received from the core network in previous communications, in a MAC-i header for the control message. For example, the MAC-i header can utilize the following format:

| LCH-ID Field | Designation |
|---|---|
| 0000 | Logical Channel 1 |
| 0001 | Logical Channel 2 |
| ... | ... |
| 1100 | Logical Channel 13 |
| 1101 | Identification of U-RNTI being included |
| 1110 | Identification of CCCH (SRB0) |
| 1111 | Identification of E-RNTI being included |

Thus, as shown, the U-RNTI can be placed in the MAC-i header following the logical channel 13 designation, in one example. Control channel communicating component 302 can transmit the control message over common resources provided by the Node B 104 (e.g., a CCCH, CTCH, etc.). In one example, message generating component 204 can also route the CCCH (or CTCH) to the logical channel (e.g., 1110 in this example).

Control data receiving component 306 can obtain the control message in the common control resources, and user plane data determining component 308 can discern whether user plane data is present in the control message. For example, the user plane data determining component 308 can discern whether the MAC-i header includes the U-RNTI, as described. If so, the U-RNTI determining component 310 can extract the U-RNTI from the control message, and user plane data determining component 308 can extract user plane data from the control message. In one example, the control message can substantially be comprised of user plane data. In another example, user plane data can be appended to the control message, and the control message can specify parameters regarding extracting the user plane data, as described. Backhaul link component 312 can communicate the user plane data and U-RNTI to the RNC 108 for forwarding to a core network, for example.

In another example, the MAC-i header can utilize the following format:

| LCH-ID Field | Designation |
|---|---|
| 0000 | Logical Channel 1 |
| 0001 | Logical Channel 2 |
| ... | ... |
| 1100 | Logical Channel 13 |
| 1101 | Identification of CTCH for UE's having no E-RNTI (no UE identifier included) |
| 1110 | Identification of CCCH (SRB0) |
| 1111 | Identification of E-RNTI being included |

Thus, where no U-RNTI (or other identifier) is present, message generating component 204 can specify a CTCH provided by the Node B 104 relating to UEs without E-RNTIs in the logical field 1101. In this example, the message generating component can bundle the user plane data with a control message that includes some sort of UE identifier (such as a CELL UPDATE message having a U-RNTI) to facilitate identification by the Node B 104/RNC 108. Similarly, in another example, message generating component 204 can include a random E-RNTI in the logical field 1111 so as not to reserve a logical field for U-RNTI or CTCH specification. Again, for example, this can be bundled with a control message that identifies the UE 102 to allow association by the Node B. One possible advantage to this implementation is the Node B 104 can subsequently forward user plane data to the RNC 108 with the random E-RNTI; thus no changes are required in the Node B 104 to RNC 108 interface. The Node B 104 can store an association between the random E-RNTI and U-RNTI in the control message, for example.

In any case, UE 102 can switch from a URA_PCH mode to a CELL_FACH mode and request dedicated resources from Node B 104. As described, this request can be formulated by the message generating component 204 and have user plane data from the user plane data component 202 appended. Thus, UE 102 can also communicate user plane data to Node B 104 when requesting dedicated resources. When in CELL_FACH state, however, UE 102 can include E-RNTI in the request. Control channel communicating component 302 can transmit the request over the CCCH, and control data receiving component 306 can receive the request. User plane data determining component 308 can extract the user plane data, and backhaul link component 312 can communicate the data to the RNC 108 along with the E-RNTI. Dedicated resource providing component 314 can process the request for dedicated resources and grant or deny the resources. If granted, resource receiving component 304 can receive the grant (e.g., along with or separate from a response to the user plane data transmission). UE 102 can subsequently utilize the resources to communicate user plane data to Node B 104, for example.

Figure 4:
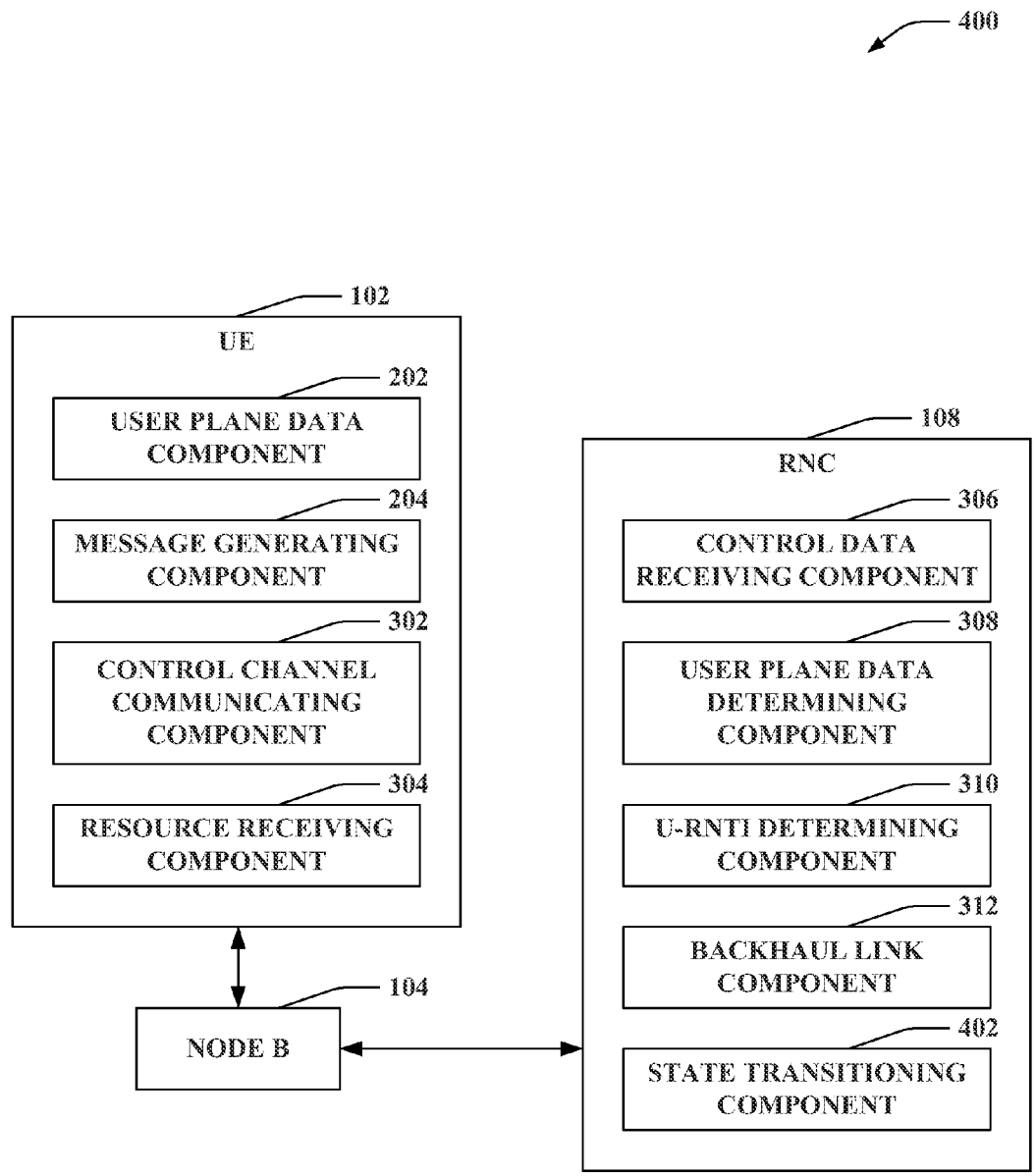
FIG. 4 illustrates an example wireless communication network that effectuates communicating user plane data in a cell reselection or other message.

Now referring to FIG. 4, illustrated is a wireless communications system 400 that facilitates communicating user plane data over common control resources without an E-RNTI. System 400 includes a UE 102, which as described can be a mobile device or other device that receives wireless network access, and a Node B 104, which as described can be substantially any type of base station, macrocell, femtocell, or picocell access points, mobile device (including not only an independently powered device, but also a modem, for example), and/or the like, that provides wireless network access, and/or portion thereof. System 400 also includes an RNC 108 that can host a plurality of Node Bs, including Node B 104, to provide network access thereto. Moreover, system 400 can be a MIMO system and/or can conform to one or more wireless network system specifications (e.g., EV-DO, 3GPP, 3GPP2, 3GPP LTE, WiMAX, etc.). Moreover, UE 102 and/or Node B 104 can comprise additional components to facilitate wireless communications.

UE 102 can include a user plane data component 202 that receives user plane data for transmitting to one or more Node Bs, a message generating component 204 that creates a control message including the user plane data for transmission over common control resources, a control channel communicating component 302 that transmits control messages over common control resources, and a resource receiving component 304 that can receive a resource grant from one or more Node Bs for dedicated resources. RNC 108 includes a control data receiving component 306 that implements common control resources and obtains control messages transmitted thereover, a user plane data determining component 308 that discerns whether user plane data is transmitted in one or more control messages and extracts the user plane data, a U-RNTI determining component 310 that extracts a U-RNTI from one or more control messages that comprise user plane data, a backhaul link component 312 that communicates with a core network (not shown) to provide core network access to one or more UEs, and state transitioning component 402 that can modify a communication state of UE 102.

According to an example, UE 102 can be connected to Node B 104 in a connected mode state, such as CELL_FACH, CELL_DCH, CELL_PCH, URA_PCH, etc. When in a CELL_FACH or CELL_PCH state, UE 102 can have an E-RNTI assigned by the Node B 104 and can include the E-RNTI when transmitting DTCH or DCCH data over a CCCH provided by the Node B 104. Thus, Node B 104 can identify the UE 102 based on the E-RNTI and accordingly process any included DTCH or DCCH data. In this example, user plane data component 202 can receive or otherwise define the DTCH or DCCH data, and message generating component 204 can include the user plane data in a CCCH message having the E-RNTI indicated in the MAC-i header, for example.

Moreover, for example, where the UE 102 is in a URA_PCH state, user plane data component 202 can receive or otherwise define user plane data for transmitting to the RNC 108 via Node B 104. Message generating component 204 can create a control message for transporting the user plane data. This can be a cell reselection (e.g., CELL UPDATE) or other message, processed by an RNC, that includes a U-RNTI of UE 102. Moreover, message generating component 204 can concatenate user plane data from user plane data component 202 to the cell reselection or other message. Message generating component 204 can also include parameters regarding the user plane data in the message, such as whether the data is DTCH or DCCH data, data size, and logical channel, for example. Control channel communicating component 302 can transmit the cell reselection or other message to Node B 104 over provided common control resources (e.g., CCCH), which can forward the message to RNC 108 for processing.

Control data receiving component 306 can obtain the cell reselection or other message, and user plane data determining component 308 can discern whether user plane data is present at least in part by determining whether the parameters regarding the user plane data are present. If so, U-RNTI determining component 310 can extract the U-RNTI from the cell reselection or other message, and the user plane data determining component 308 can extract the user plane data received at the end of the control message based on the parameters mentioned above. For example, user plane data determining component 308 can utilize the size to determine a length passed the end of the cell reselection message to read to determine the user plane data. Backhaul link component 312 can provide the user plane data and U-RNTI to a core network. Moreover, RNC 108 can process the cell reselection or other message as it would if user plane data was not comprised in the message. In this regard, state transitioning component 402 can set the UE 102 to a CELL_FACH, CELL_DCH, or other active state to receive data from the network through RNC 108 and Node B 104. For example, the data from the network can be a response to the user plane data.

Figure 5:
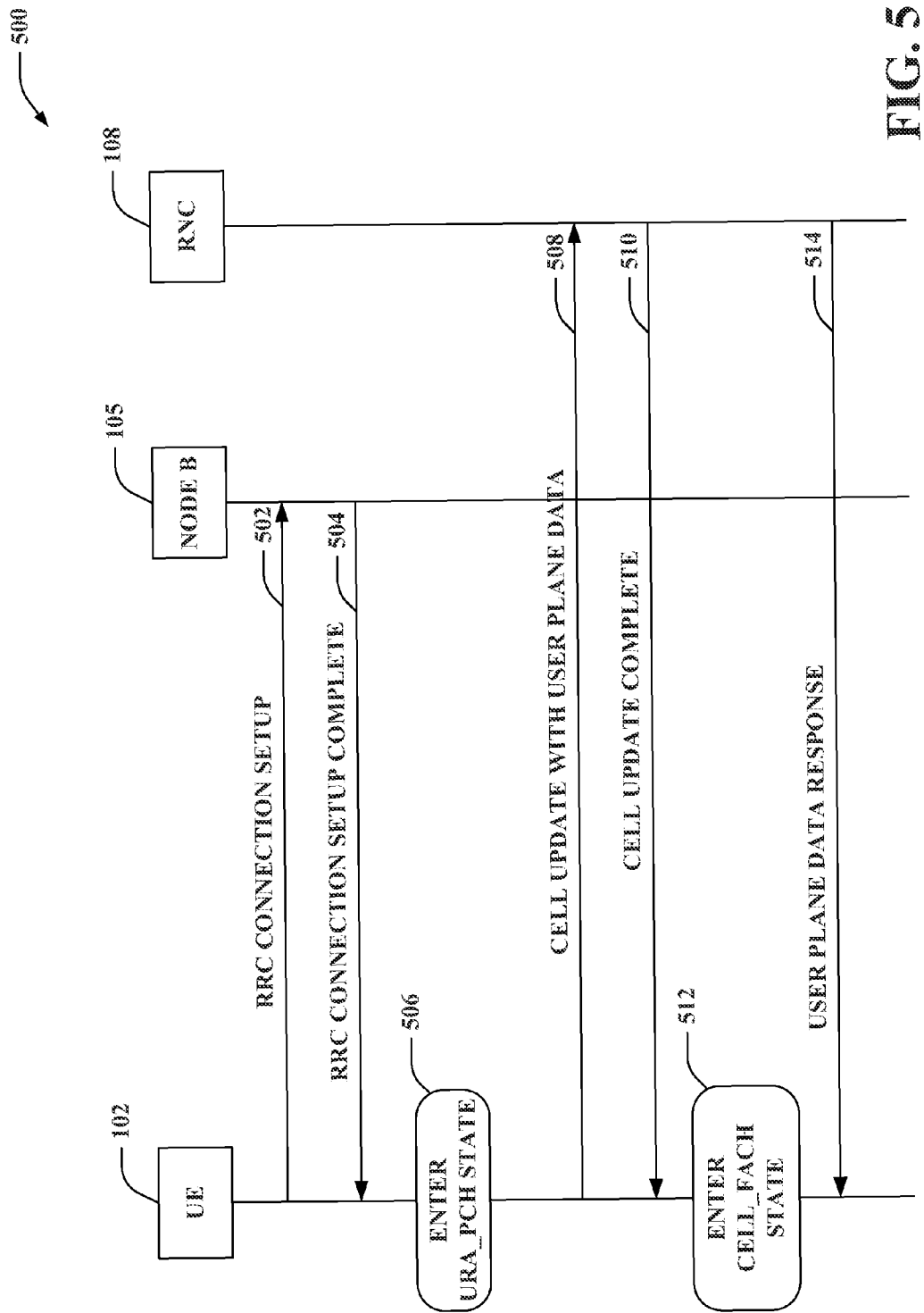
FIG. 5 illustrates an example system for communicating user plane data and a related U-RNTI over common control resources.

Turning to FIG. 5, an example system 500 is depicted that facilitates communicating user plane data in control messages without an E-RNTI. System 500 includes a UE 102 that can wirelessly communicate with a Node B 104 to receive access to a wireless network (not shown). UE 102, for example, can attempt connection to Node B 104. This can occur when UE 102 is powered up, moving from an area without coverage, and/or the like. UE 102 can send an RRC connection setup 502 to Node B 104 to attempt radio bearer establishment. Node B 104 can authenticate/authorize the UE 102 with a backend network, for example, and transmit an RRC connection setup complete 504 to the UE 102, which can include a E-RNTI related to the Node B 104 that the UE 102 can utilize in communicating over common resources. At some point during communications with Node B 104, or lack thereof, UE 102 can transition to a URA_PCH state at 506.

While in this state, the E-RNTI provided to the UE 102 is no longer valid for UE 102. Indeed, UE 102 can travel over the network in this state and reselect to one or more Node Bs. UE 102 can at some point require connection to the Node B 104, which can be different than the previous Node B 104 due to reselection, and can transmit a CELL UPDATE message (or other cell reselection message) with appended user plane data 508 thereto. As described herein, the CELL UPDATE message can include a U-RNTI related to the UE 102 (which can have been previously assigned by the backend network). RNC 108 can receive the user plane data and U-RNTI and forward the data and U-RNTI to one or more backend network components for processing. RNC 108 can additionally transmit the CELL UPDATE message to the one or more backend network components. Upon receiving a response from the network, RNC 108 can transmit a CELL UPDATE complete 510 to the UE 102, and UE 102 can enter a CELL_FACH state 512. Thus, for example, the CELL UPDATE complete 510 may contain an E-RNTI for UE 102. In addition, RNC 108 can receive a response to the user plane data and transmit the user plane data response 514 to the UE 102. In one example, the user plane data response 514 can be included with the CELL UPDATE complete 510. In addition, as described, it is to be appreciated that instead of sending a CELL UPDATE, UE 102 can send a generated control message with a modified MAC-i header.

Referring now to FIGS. 6-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 6:
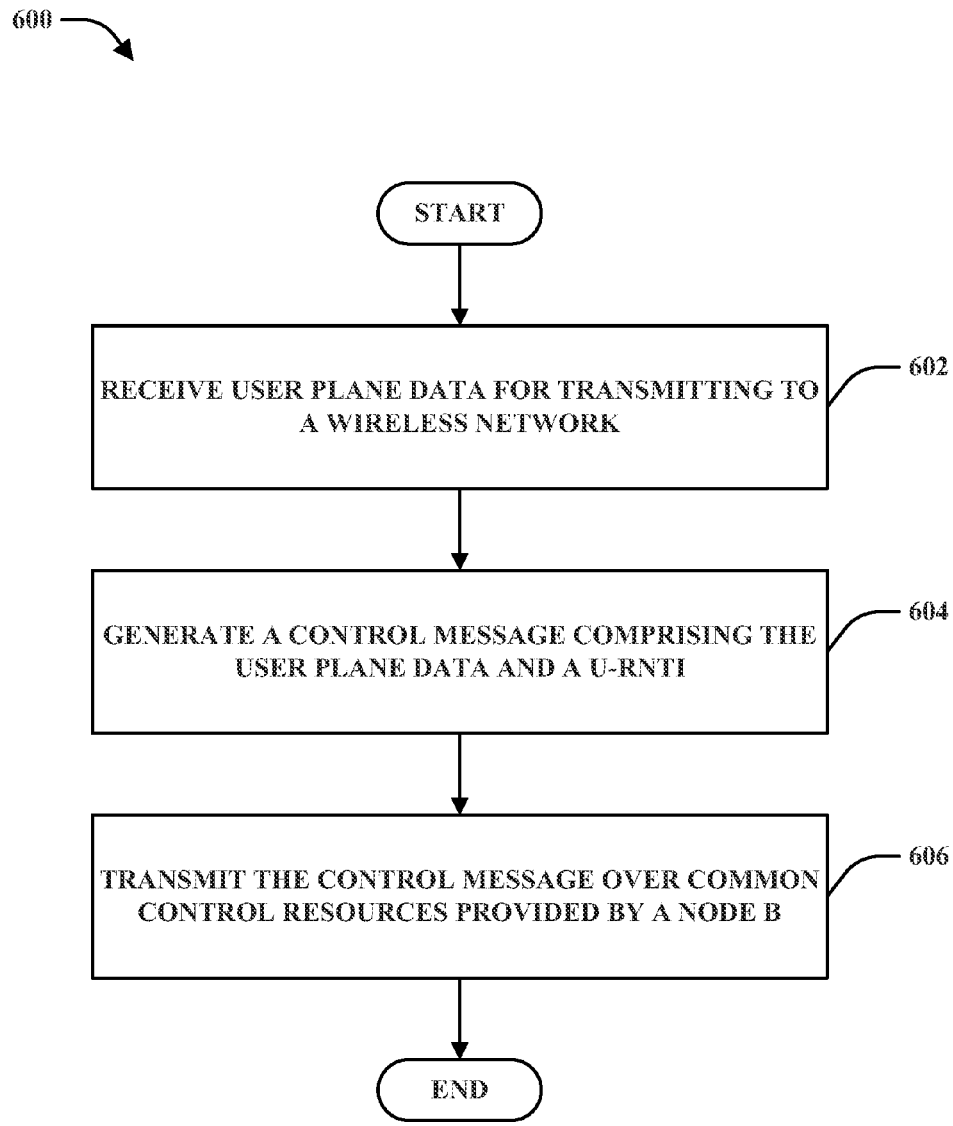
FIG. 6 is a flow diagram of an example methodology that transmits user plane data over common control resources.

With reference to FIG. 6, illustrated is an example methodology 600 for transmitting user plane data in control messages over common resources. At 602, user plane data can be received for transmitting to a wireless network. As described, the user plane data can be obtained or generated based on a request by a user, in an example. At 604, a control message can be generated comprising the user plane data and a U-RNTI. The U-RNTI can be received from a wireless network and can be placed in a MAC-i header, within the control message itself (e.g., where the control message is a CELL UPDATE message or other message that has a parameter value for U-RNTI), and/or the like. At 606, the control message can be transmitted over common control resources provided by a Node B. Thus, a Node B can associate the user plane data with the U-RNTI to facilitate routing responses or other transmissions related to the U-RNTI.

Figure 7:
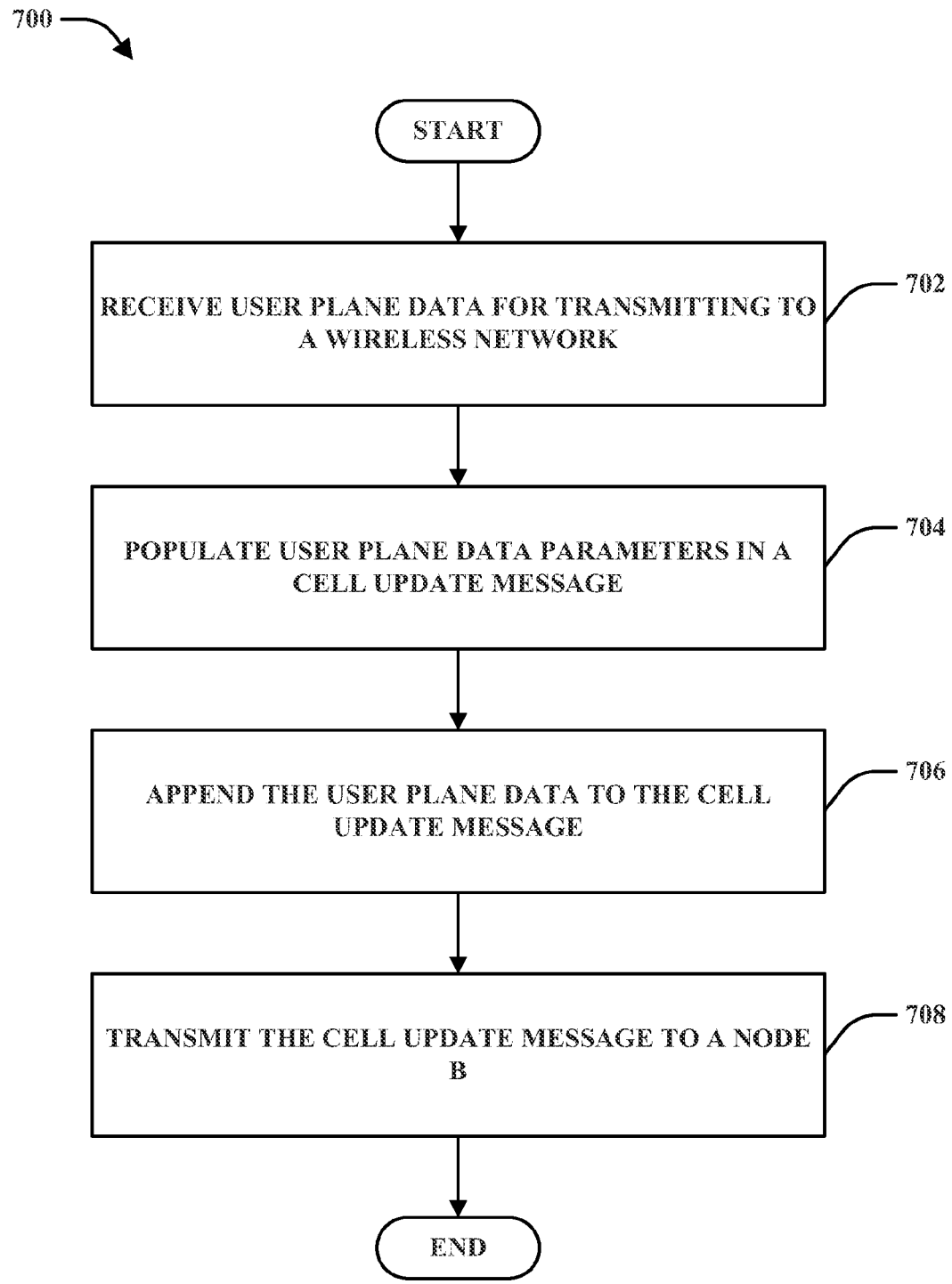
FIG. 7 is a flow diagram of an example methodology that facilitates transmitting user plane data in a CELL UPDATE message.

Turning now to FIG. 7, an example methodology 700 is shown that facilitates providing user plane data to a Node B as part of a CELL UPDATE message. At 702, user plane data can be received for transmitting to a wireless network. At 704, parameters regarding the user plane data can be populated in a CELL UPDATE message. For example, the parameters can relate to a type of the user plane data (e.g., DTCH or DCCH), a size of the data, a logical channel over which the user plane data is transmitted, and/or the like. At 706, the user plane data can be appended to the CELL UPDATE MESSAGE. Thus, for example, if a receiving Node B/RNC locates the parameters, it can determine that user plane data is attached to the CELL UPDATE message and decode the data according to the parameters. At 708, the CELL UPDATE message can be transmitted to a Node B, as described.

Figure 8:
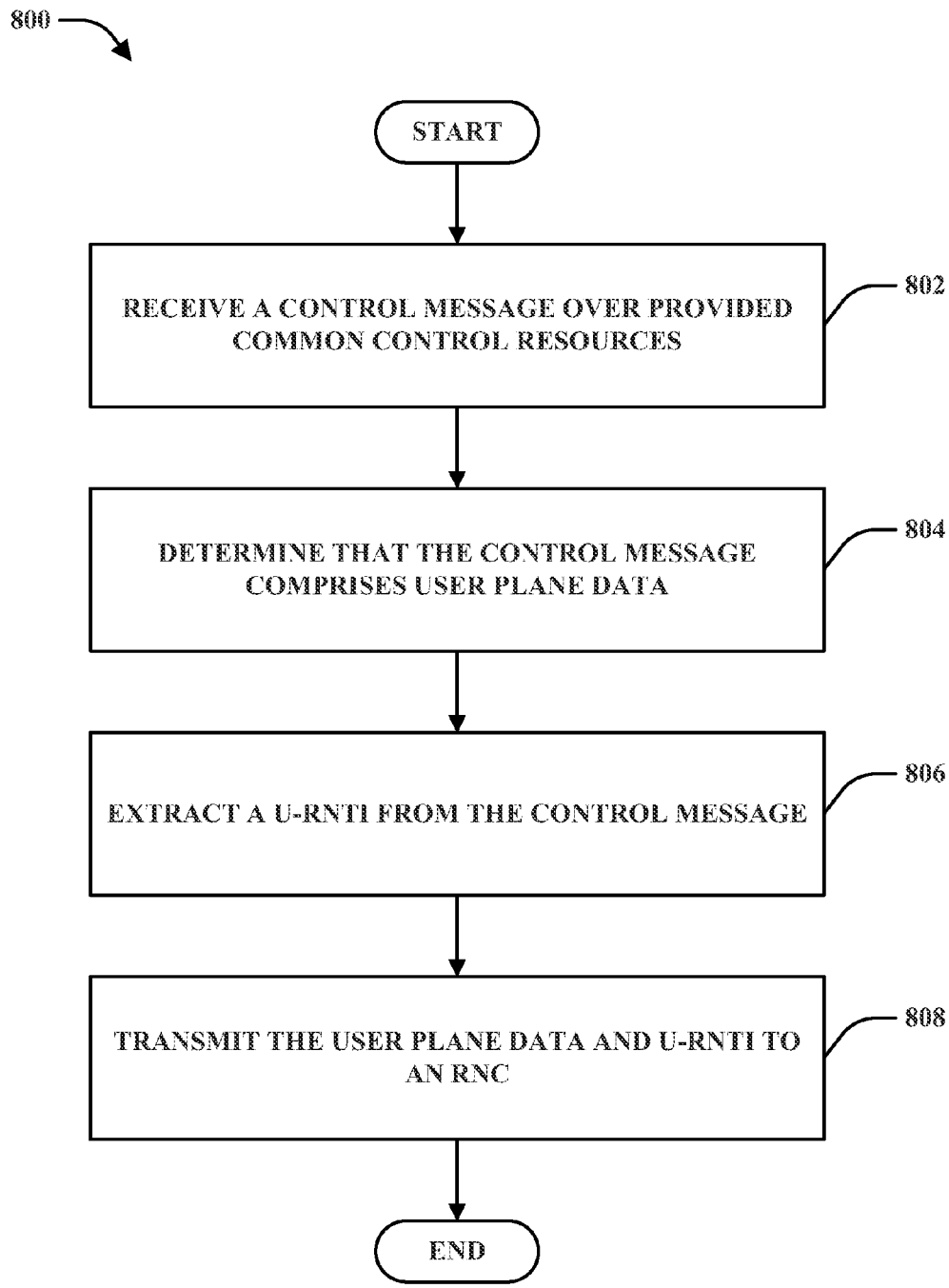
FIG. 8 is a flow diagram of an example methodology that receives user plane data over common control resources along with a related U-RNTI.

Referring now to FIG. 8, illustrated is an example methodology 800 for receiving user plane data over common control resources. At 802, a control message can be received over provided common control resources. For example, the control message can be received from a UE in a URA_PCH or similar inactive state. At 804, it can be determined that the control message comprises user plane data. As described, this can be discerned based at least in part on whether there are parameters related to the user plane data present in the control message, such as type, size, logical channel, etc. In another example, this can be discerned based at least in part on a structure of a MAC-header related to the control message (e.g., whether the MAC-i header includes a U-RNTI). At 806, a U-RNTI can be extracted from the control message. As described, this can be from the message itself, a MAC-i header related to the message, and/or the like. At 808, the user plane data and U-RNTI can be transmitted to an RNC. In this regard, the RNC can send the data to a wireless network for processing and provide a response if received.

Figure 9:
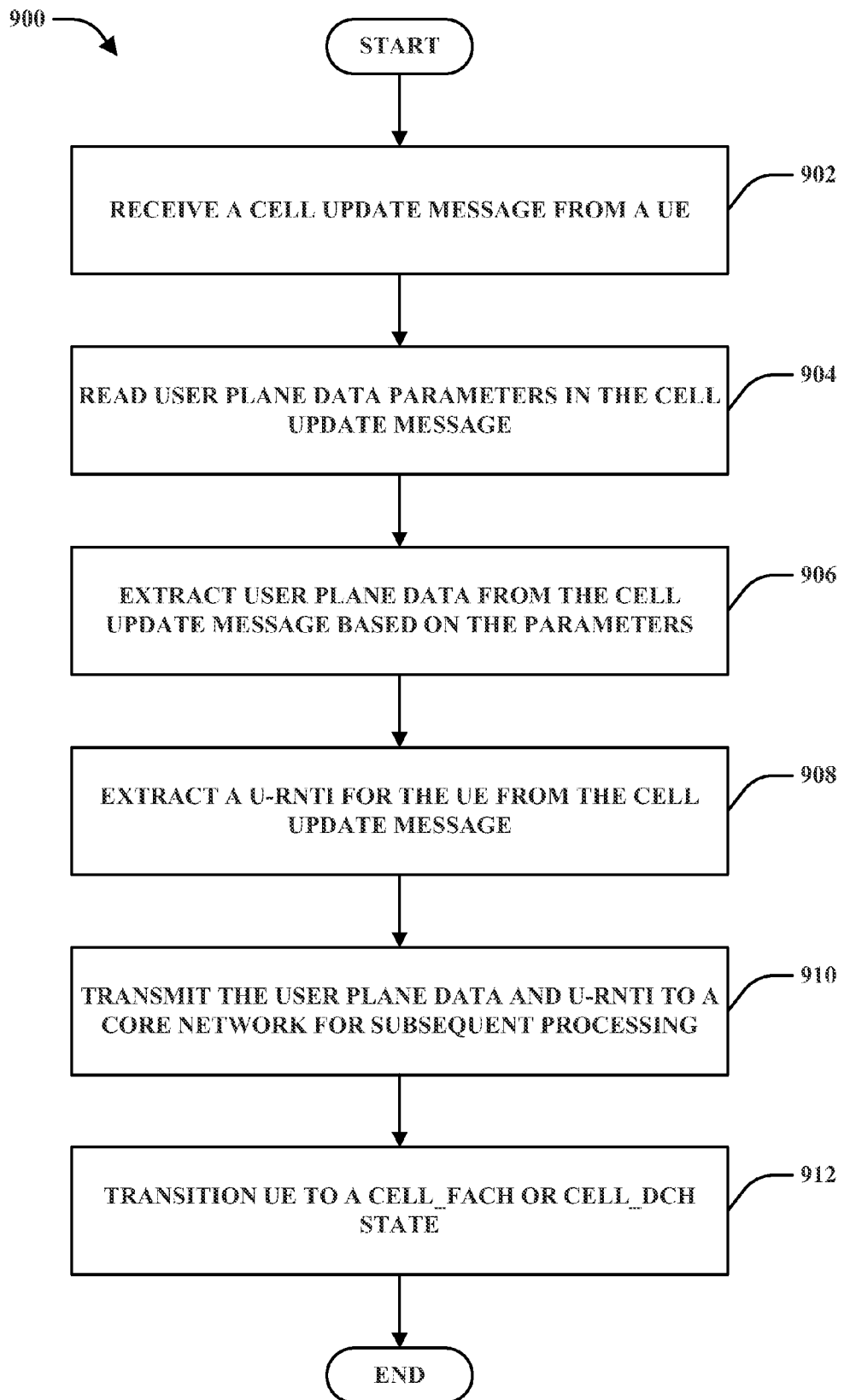
FIG. 9 is a flow diagram of an example methodology that facilitates receiving user plane data in a CEL UPDATE message.

Turning to FIG. 9, an example methodology 900 for receiving user plane data in a CELL UPDATE message is illustrated. At 902, a CELL UPDATE message can be received from a UE. As described, the CELL UPDATE message can be typically received to update a wireless network regarding cell reselection by the UE. At 904, user plane data parameters can be read in the CELL UPDATE message. Where the parameters are present in the CELL UPDATE message, this can indicate that user plane data is appended to the message. Thus, at 906, user plane data can be extracted from the CELL UPDATE message based on the parameters. For example, where the parameters include size, the data can be extracted from the end of the CELL UPDATE message for the indicated size, etc. A U-RNTI for the UE can be extracted from the cell update message at 908. This allows association of the user plane data to the UE. At 910, the user plane data and U-RNTI can be transmitted to a core network for subsequent processing. It is to be appreciated that response or other data related to the U-RNTI can be received; the U-RNTI can be utilized to associate the response or other data to the UE, as described. At 912, the UE can be transitioned to a CELL_FACH or CELL_DCH state to complete processing of the CELL UPDATE message.

It will be appreciated that, in accordance with one or more aspects described herein, inferences can be made regarding determining that a control message includes user plane data, determining the U-RNTI from the control message, associating the user plane data with the U-RNTI, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
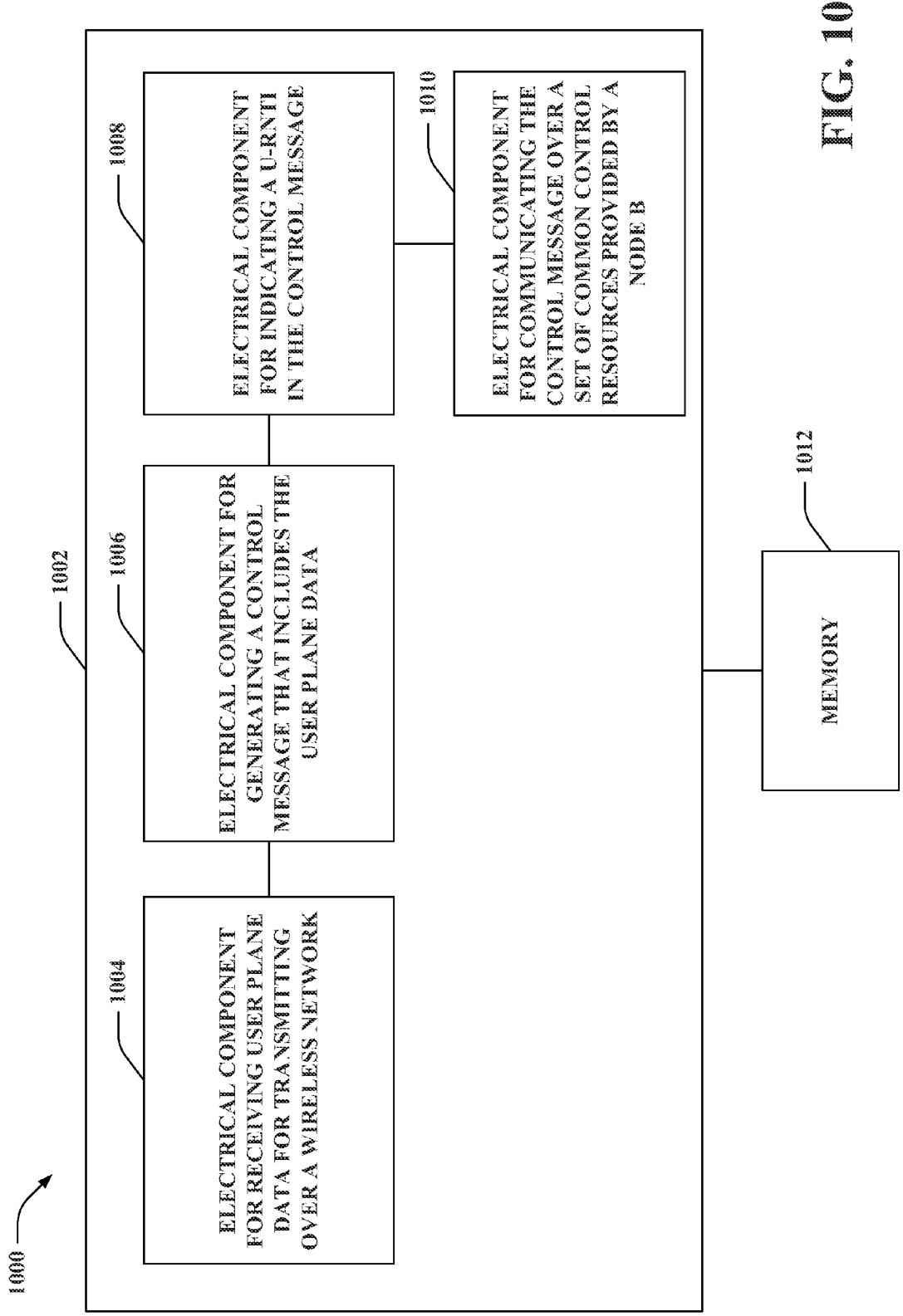
FIG. 10 is a block diagram of an example apparatus that provides user plane data in common control resources specifying a U-RNTI.

With reference to FIG. 10, illustrated is a system 1000 that provides user plane data with a U-RNTI to facilitate the user plane data when an E-RNTI is not received. For example, system 1000 can reside at least partially within a base station, mobile device, or another device that provides access to a wireless network. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving user plane data for transmitting over a wireless network 1004. As described, the user plane data can be obtained or generated in connection with an operator request and/or the like. Further, logical grouping 1002 can comprise an electrical component for generating a control message that includes the user plane data 1006. For example, a cell reselection or other control message can be utilized. Moreover, for example, the user plane data can exist within the control message, be appended to the control message, and/or the like.

Furthermore, logical grouping 1002 can include an electrical component for indicating a U-RNTI in the control message 1008. As described herein, the U-RNTI can be indicated in a parameter field for the U-RNTI (e.g., in a CELL UPDATE message), in a MAC-i or other header related to the control message, and/or the like. Moreover, logical grouping 1002 can include an electrical component for communicating the control message over a set of common control resources provided by a Node B 1010. Thus, the control message can be communicated with user plane data and a U-RNTI identifying the system 1000. In this regard, system 1000 can transmit user plane data in a URA_PCH or similar inactive state. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

Figure 11:
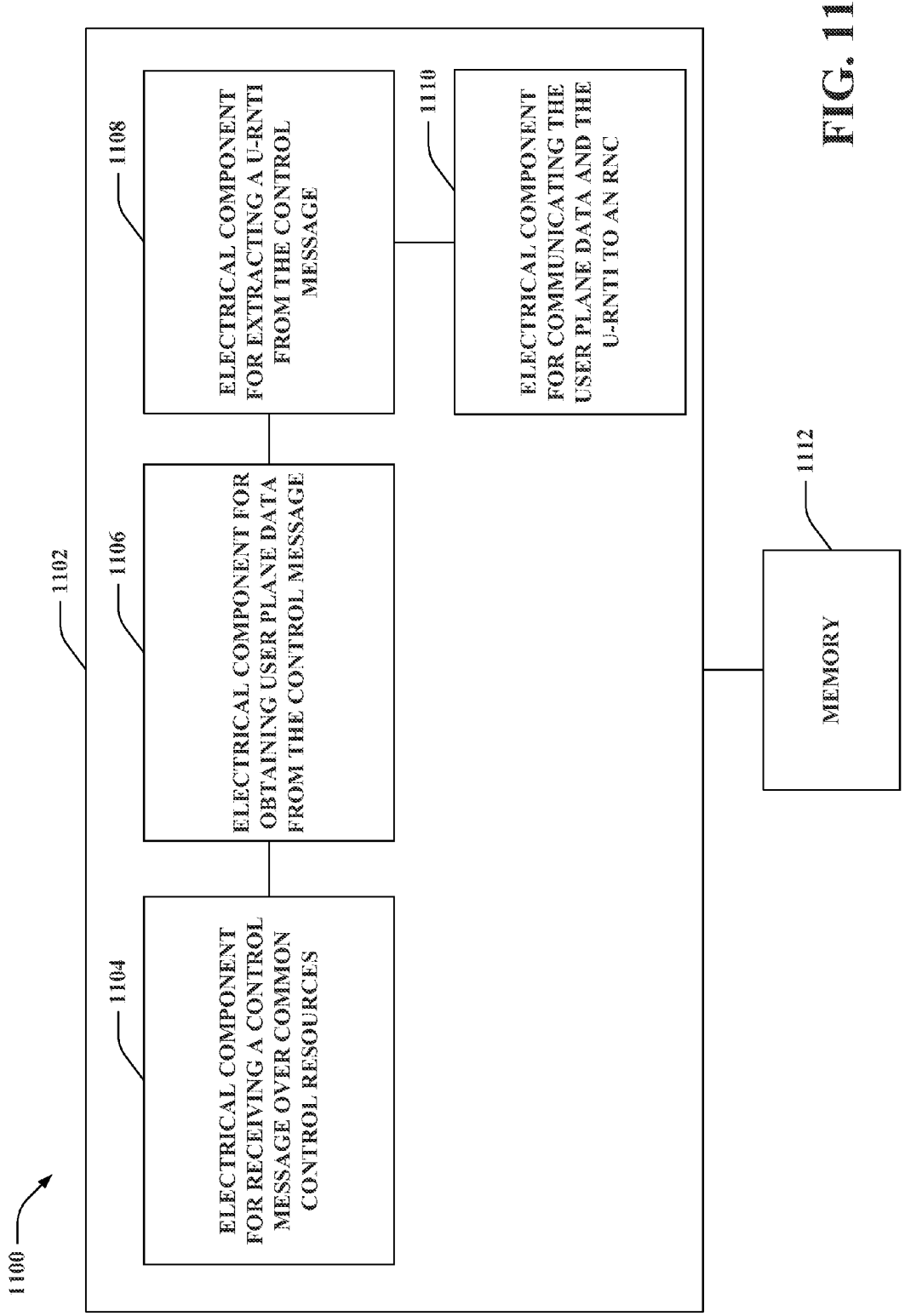
FIG. 11 is a block diagram of an example apparatus that receives user plane data in common control resources along with a U-RNTI.

Now referring to FIG. 11, illustrated is a system 1100 that receives user plane data along with a U-RNTI for transmitting to an RNC. For example, system 1100 can reside at least partially within a base station, mobile device, or another device that provides access to a wireless network. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving a control message over common control resources 1104. Further, logical grouping 1102 can comprise an electrical component for obtaining user plane data from the control message 1106. For example, the user plane data can be obtained based at least in part on discovering its existence in the control message (e.g., according to parameters related thereto, detecting one or more appendices to a type of control message, discerning such based on presence of a U-RNTI in a MAC-i header or other header related to the control message, and/or the like).

Furthermore, logical grouping 1102 can include an electrical component for extracting a U-RNTI from the control message 1108. As described herein, the U-RNTI can be indicated in a parameter field for the U-RNTI (e.g., in a CELL UPDATE message), in a MAC-i or other header related to the control message, and/or the like. Moreover, logical grouping 1102 can include an electrical component for communicating the user plane data and the U-RNTI to an RNC 1110. Thus, user plane data can be received and processed in a control message based on a U-RNTI. Return data from the RNC can be associated with the transmitting UE based on the U-RNTI, as described previously. Additionally, system 1100 can include a memory 1112 that retains instructions for executing functions associated with electrical components 1104, 1106, 1108, and 1110. While shown as being external to memory 1112, it is to be understood that one or more of electrical components 1104, 1106, 1108, and 1110 can exist within memory 1112.

Figure 12:
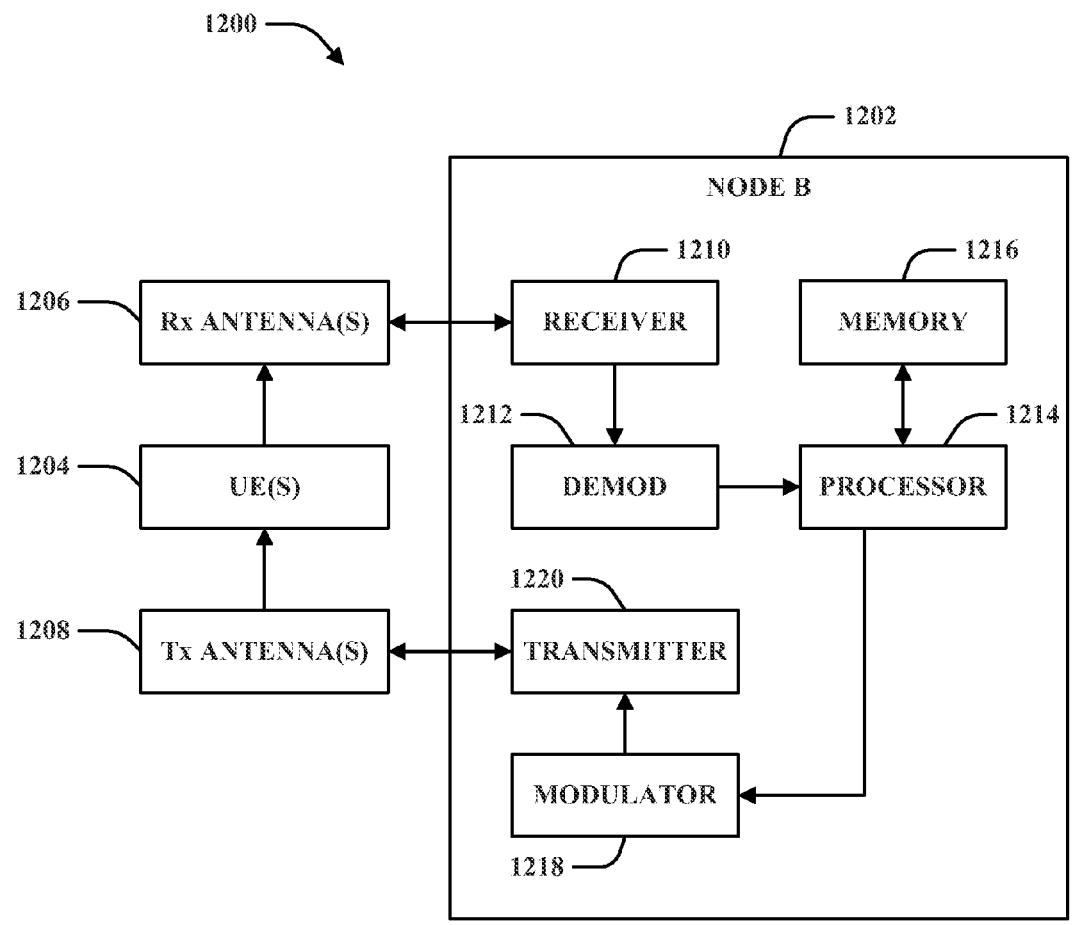
FIGS. 12-13 are block diagrams of example wireless communication devices that can be utilized to implement various aspects of the functionality described herein.

FIG. 12 is a block diagram of a system 1200 that can be utilized to implement various aspects of the functionality described herein. In one example, system 1200 includes a base station or Node B 1202. As illustrated, Node B 1202 can receive signal(s) from one or more UEs 1204 via one or more receive (Rx) antennas 1206 and transmit to the one or more UEs 1204 via one or more transmit (Tx) antennas 1208. Additionally, Node B 1202 can comprise a receiver 1210 that receives information from receive antenna(s) 1206. In one example, the receiver 1210 can be operatively associated with a demodulator (Demod) 1212 that demodulates received information. Demodulated symbols can then be analyzed by a processor 1214. Processor 1214 can be coupled to memory 1216, which can store information related to code clusters, access terminal assignments, lookup tables related thereto, unique scrambling sequences, and/or other suitable types of information. In one example, Node B 1202 can employ processor 1214 to perform methodologies 600, 700, 800, 900 and/or other similar and appropriate methodologies. Node B 1202 can also include a modulator 1218 that can multiplex a signal for transmission by a transmitter 1220 through transmit antenna(s) 1208.

Figure 13:
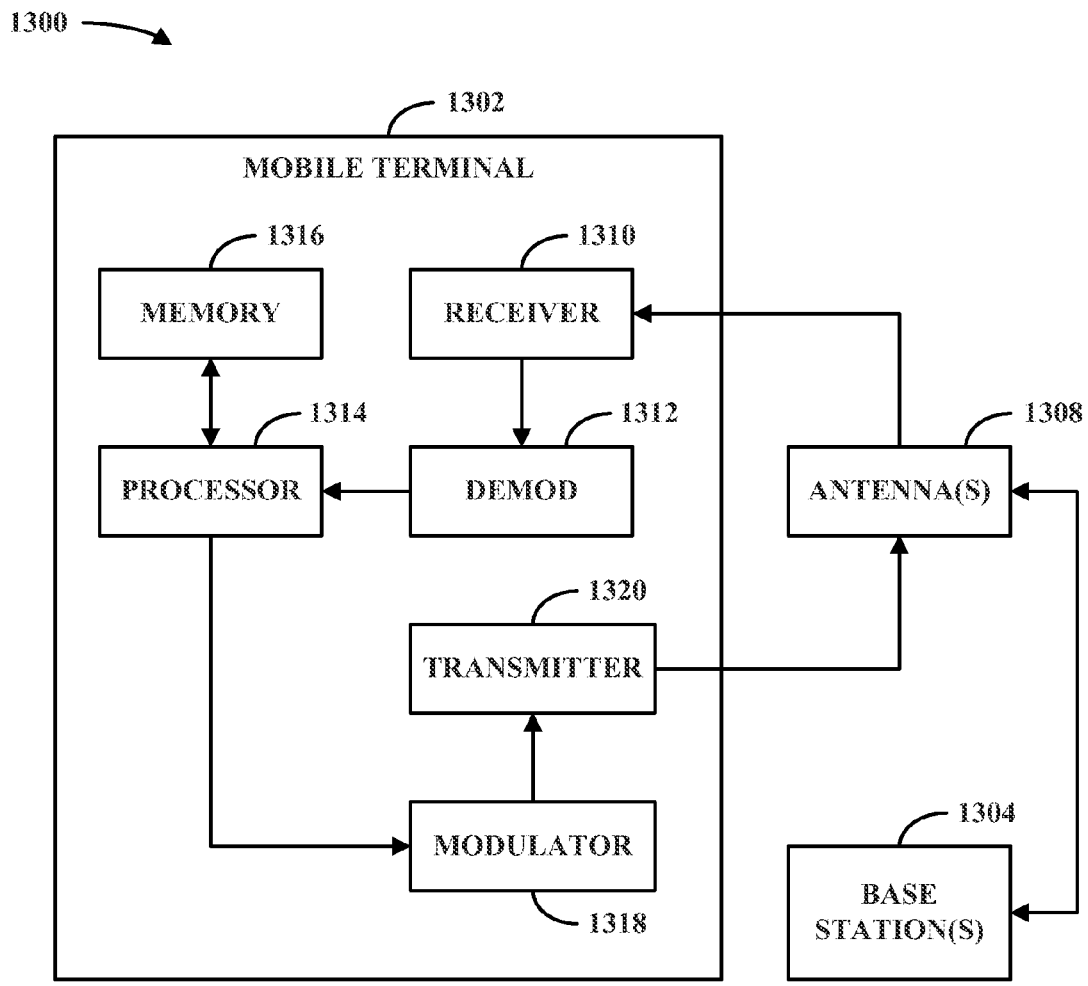

FIG. 13 is a block diagram of another system 1300 that can be utilized to implement various aspects of the functionality described herein. In one example, system 1300 includes a mobile terminal 1302. As illustrated, mobile terminal 1302 can receive signal(s) from one or more base stations 1304 and transmit to the one or more base stations 1304 via one or more antennas 1308. Additionally, mobile terminal 1302 can comprise a receiver 1310 that receives information from antenna(s) 1308. In one example, receiver 1310 can be operatively associated with a demodulator (Demod) 1312 that demodulates received information. Demodulated symbols can then be analyzed by a processor 1314. Processor 1314 can be coupled to memory 1316, which can store data and/or program codes related to mobile terminal 1302. Additionally, mobile terminal 1302 can employ processor 1314 to perform methodologies 600, 700, 800, 900, and/or other similar and appropriate methodologies. Mobile terminal 1302 can also employ one or more components described in previous figures to effectuate the described functionality; in one example, the components can be implemented by the processor 1314. Mobile terminal 1302 can also include a modulator 1318 that can multiplex a signal for transmission by a transmitter 1320 through antenna(s) 1308.

Figure 14:
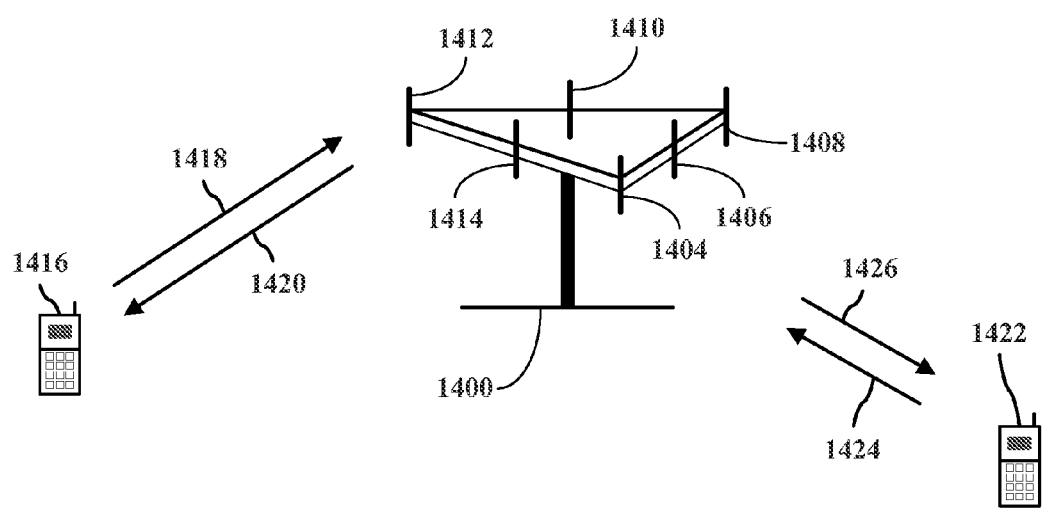
FIG. 14 illustrates an example wireless multiple-access communication system in accordance with various aspects set forth herein.

Referring now to FIG. 14, an illustration of a wireless multiple-access communication system is provided in accordance with various aspects. In one example, an access point 1400 (AP) includes multiple antenna groups. As illustrated in FIG. 14, one antenna group can include antennas 1404 and 1406, another can include antennas 1408 and 1410, and another can include antennas 1412 and 1414. While only two antennas are shown in FIG. 14 for each antenna group, it should be appreciated that more or fewer antennas may be utilized for each antenna group. In another example, an access terminal 1416 can be in communication with antennas 1412 and 1414, where antennas 1412 and 1414 transmit information to access terminal 1416 over forward link 1420 and receive information from access terminal 1416 over reverse link 1418. Additionally and/or alternatively, access terminal 1422 can be in communication with antennas 1406 and 1408, where antennas 1406 and 1408 transmit information to access terminal 1422 over forward link 1426 and receive information from access terminal 1422 over reverse link 1424. In a frequency division duplex system, communication links 1418, 1420, 1424 and 1426 can use different frequency for communication. For example, forward link 1420 may use a different frequency then that used by reverse link 1418.

Each group of antennas and/or the area in which they are designed to communicate can be referred to as a sector of the access point. In accordance with one aspect, antenna groups can be designed to communicate to access terminals in a sector of areas covered by access point 1400. In communication over forward links 1420 and 1426, the transmitting antennas of access point 1400 can utilize beamforming in order to improve the signal-to-noise ratio of forward links for the different access terminals 1416 and 1422. Also, an access point using beamforming to transmit to access terminals scattered randomly through its coverage causes less interference to access terminals in neighboring cells than an access point transmitting through a single antenna to all its access terminals.

An access point, e.g., access point 1400, can be a fixed station used for communicating with terminals and can also be referred to as a base station, a Node B, an access network, and/or other suitable terminology. In addition, an access terminal, e.g., an access terminal 1416 or 1422, can also be referred to as a mobile terminal, user equipment, a wireless communication device, a terminal, a wireless terminal, and/or other appropriate terminology.

Figure 15:
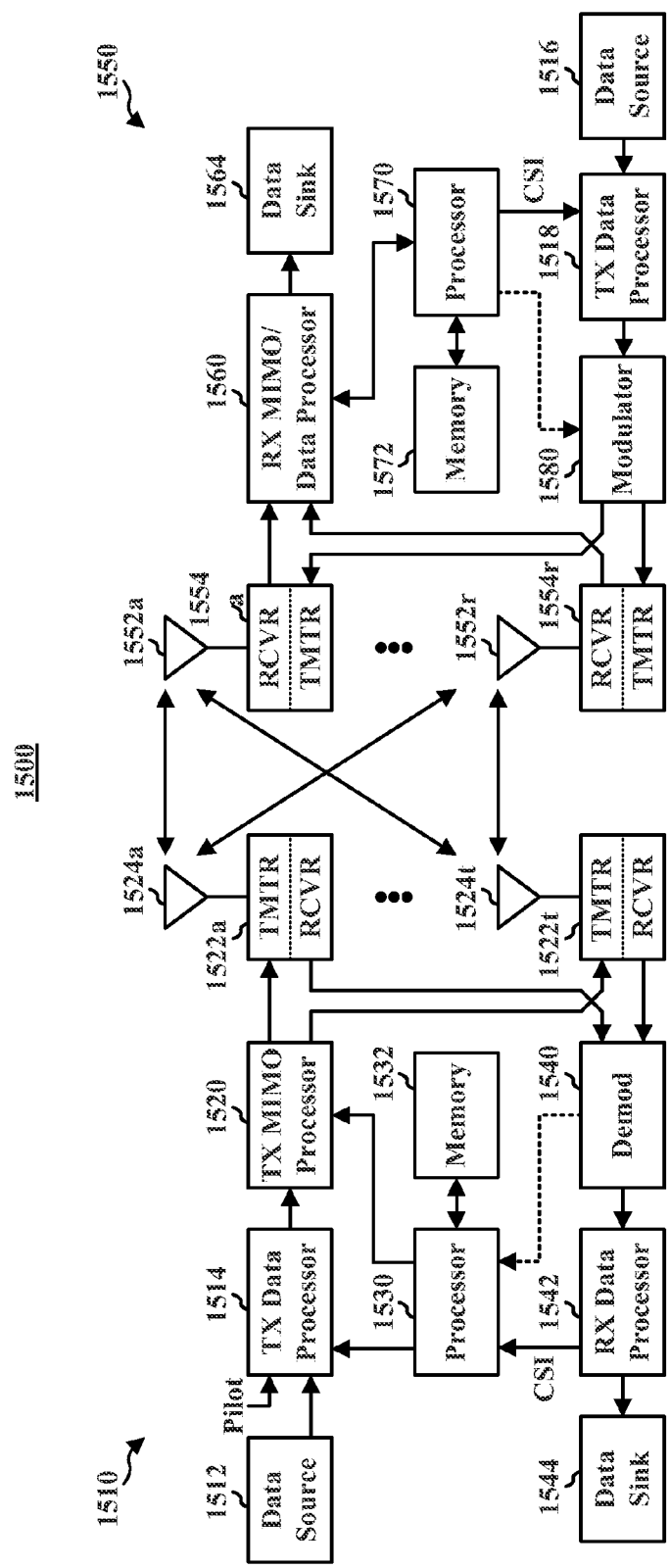
FIG. 15 is a block diagram illustrating an example wireless communication system in which various aspects described herein can function.

Referring now to FIG. 15, a block diagram illustrating an example wireless communication system 1500 in which various aspects described herein can function is provided. In one example, system 1500 is a multiple-input multiple-output (MIMO) system that includes a transmitter system 1510 and a receiver system 1550. It should be appreciated, however, that transmitter system 1510 and/or receiver system 1550 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1510 and/or receiver system 1550 described herein could be utilized in connection with a single output to single input antenna system.

In accordance with one aspect, traffic data for a number of data streams are provided at transmitter system 1510 from a data source 1512 to a transmit (TX) data processor 1514. In one example, each data stream can then be transmitted via a respective transmit antenna 1524. Additionally, TX data processor 1514 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1550 to estimate channel response. Back at transmitter system 1510, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1530.

Next, modulation symbols for all data streams can be provided to a TX processor 1520, which can further process the modulation symbols (e.g., for OFDM). TX MIMO processor 1520 can then provides $N_T$ modulation symbol streams to $N_T$ transceivers 1522a through 1522t. In one example, each transceiver 1522 can receive and process a respective symbol stream to provide one or more analog signals. Each transceiver 1522 can then further condition (e.g., amplify, filter, and upconvert) the analog signals to provide a modulated signal suitable for transmission over a MIMO channel. Accordingly, $N_T$ modulated signals from transceivers 1522a through 1522t can then be transmitted from $N_T$ antennas 1524a through 1524t, respectively.

In accordance with another aspect, the transmitted modulated signals can be received at receiver system 1550 by $N_R$ antennas 1552a through 1552r. The received signal from each antenna 1552 can then be provided to respective transceivers 1554. In one example, each transceiver 1554 can condition (e.g., filter, amplify, and downconvert) a respective received signal, digitize the conditioned signal to provide samples, and then processes the samples to provide a corresponding "received" symbol stream. An RX MIMO/data processor 1560 can then receive and process the $N_R$ received symbol streams from $N_R$ transceivers 1554 based on a particular receiver processing technique to provide $N_T$ "detected" symbol streams. In one example, each detected symbol stream can include symbols that are estimates of the modulation symbols transmitted for the corresponding data stream. RX processor 1560 can then process each symbol stream at least in part by demodulating, deinterleaving, and decoding each detected symbol stream to recover traffic data for a corresponding data stream. Thus, the processing by RX processor 1560 can be complementary to that performed by TX MIMO processor 1520 and TX data processor 1516 at transmitter system 1510. RX processor 1560 can additionally provide processed symbol streams to a data sink 1564.

In accordance with one aspect, the channel response estimate generated by RX processor 1560 can be used to perform space/time processing at the receiver, adjust power levels, change modulation rates or schemes, and/or other appropriate actions. Additionally, RX processor 1560 can further estimate channel characteristics such as, for example, signal-to-noise-and-interference ratios (SNRs) of the detected symbol streams. RX processor 1560 can then provide estimated channel characteristics to a processor 1570. In one example, RX processor 1560 and/or processor 1570 can further derive an estimate of the "operating" SNR for the system. Processor 1570 can then provide channel state information (CSI), which can comprise information regarding the communication link and/or the received data stream. This information can include, for example, the operating SNR. The CSI can then be processed by a TX data processor 1518, modulated by a modulator 1580, conditioned by transceivers 1554a through 1554r, and transmitted back to transmitter system 1510. In addition, a data source 1516 at receiver system 1550 can provide additional data to be processed by TX data processor 1518.

Back at transmitter system 1510, the modulated signals from receiver system 1550 can then be received by antennas 1524, conditioned by transceivers 1522, demodulated by a demodulator 1540, and processed by a RX data processor 1542 to recover the CSI reported by receiver system 1550. In one example, the reported CSI can then be provided to processor 1530 and used to determine data rates as well as coding and modulation schemes to be used for one or more data streams. The determined coding and modulation schemes can then be provided to transceivers 1522 for quantization and/or use in later transmissions to receiver system 1550. Additionally and/or alternatively, the reported CSI can be used by processor 1530 to generate various controls for TX data processor 1514 and TX MIMO processor 1520. In another example, CSI and/or other information processed by RX data processor 1542 can be provided to a data sink 1544.

In one example, processor 1530 at transmitter system 1510 and processor 1570 at receiver system 1550 direct operation at their respective systems. Additionally, memory 1532 at transmitter system 1510 and memory 1572 at receiver system 1550 can provide storage for program codes and data used by processors 1530 and 1570, respectively. Further, at receiver system 1550, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   receiving user plane data for transmitting to a wireless network;
   generating a control message that includes at least the user plane data and a user equipment (UE) radio network temporary identifier (U-RNTI); and
   transmitting the control message that includes the user plane data and the U-RNTI to the wireless network over common control resources provided by a Node B.

2. The method of claim 1, wherein the generating the control message includes generating a cell reselection or other message that includes the U-RNTI and appending the user plane data to the cell reselection or other message.

3. The method of claim 1, further comprising inserting one or more parameters in the control message related to the user plane data.

4. The method of claim 3, wherein the one or more parameters include one or more of a data type, a size, or a logical channel related to the user plane data.

5. The method of claim 1, wherein the generating the control message includes inserting the U-RNTI in a media access control (MAC)-i header of the control message.

6. A method, comprising:
   receiving user plane data for transmitting to a wireless network;
   generating a control message that includes at least the user plane data and a user equipment (UE) radio network temporary identifier (U-RNTI); and
   transmitting the control message that includes the user plane data and the U-RNTI to the wireless network over common control resources provided by a Node B while in a universal terrestrial radio access network (UTRAN) registration area paging channel (URA_PCH) state.

7. The method of claim 1, further comprising receiving a response to the user plane data from the Node B based at least in part on the U-RNTI.

8. The method of claim 1, further comprising receiving the U-RNTI from the wireless network via one or more Node Bs.

9. A wireless communications apparatus, comprising:
   at least one processor configured to receive user plane data for transmitting to a wireless network, generate a control message that includes at least the user plane data and a user equipment (UE) radio network temporary identifier (U-RNTI) for the wireless communications apparatus, and transmit the control message that includes the user plane data and the U-RNTI to the wireless network over common control resources provided by a Node B; and
   a memory coupled to the at least one processor.

10. The wireless communications apparatus of claim 9, wherein the control message is a cell reselection or other message.

11. The wireless communications apparatus of claim 9, wherein the at least one processor is further configured to append the user plane data to the control message.

12. The wireless communications apparatus of claim 9, wherein the at least one processor is further configured to insert one or more parameters related to the user plane data in the control message.

13. The wireless communications apparatus of claim 12, wherein the one or more parameters include one or more of a type, a size, or a logical channel related to the user plane data.

14. An apparatus, comprising:
  means for receiving user plane data for transmitting over a wireless network;
  means for generating a control message that includes at least the user plane data;
  means for indicating a user equipment (UE) radio network temporary identifier (U-RNTI) in the control message; and
  means for transmitting the control message that includes the user plane data and the indicated U-RNTI to the wireless network over common control resources provided by a Node B.

15. The apparatus of claim 14, wherein the control message is a cell reselection message with the user plane data appended to the cell reselection or other message.

16. The apparatus of claim 14, wherein the means for generating the control message inserts one or more parameters related to the user plane data in the control message.

17. The apparatus of claim 16, wherein the one or more parameters includes one or more of a type, a size, or a logical channel related to the user plane data.

18. The apparatus of claim 14, wherein the means for indicating the U-RNTI in the control message populates a media access control (MAC)-i header logical channel identifier with the U-RNTI.

19. A non-transitory computer readable storage medium having computer-executable instructions recorded thereon, wherein executing the computer-executable instructions on a computer causes the computer to:
  receive user plane data for transmitting to a wireless network;
  generate a control message that includes at least the user plane data and a user equipment (UE) radio network temporary identifier (U-RNTI); and
  transmit the control message that includes the user plane data and the U-RNTI to the wireless network over common control resources provided by a Node B.

20. The computer readable storage medium of claim 19, wherein the computer-executable instructions that cause the computer to generate the control message further cause the computer to generate a cell reselection or other message that includes the U-RNTI and append the user plane data to the cell reselection or other message.

21. The computer readable storage medium of claim 19, wherein executing the computer-executable instructions on the computer further causes the computer to insert one or more parameters in the control message related to the user plane data.

22. The computer readable storage medium of claim 21, wherein the one or more parameters include one or more of a data type, a size, or a logical channel related to the user plane data.

23. The computer readable storage medium of claim 19, wherein the computer-executable instructions that cause the computer to generate the control message further cause the computer to insert the U-RNTI in a media access control (MAC)-i header of the control message.

24. An apparatus, comprising:
  a user plane data component configured to receive user plane data for transmitting over a wireless network;
  a message generating component configured to generate a control message comprising at least the user plane data;
  a user equipment (UE) radio network temporary identifier (U-RNTI) indicating component configured to specify a U-RNTI in the control message; and
  a control channel communicating component configured to transmit the control message that includes the user plane data and the specified U-RNTI to the wireless network over common control resources provided by a Node B.

25. The apparatus of claim 24, wherein the control message is a cell reselection message with the user plane data appended to the cell reselection or other message.

26. The apparatus of claim 24, wherein the message generating component inserts one or more parameters related to the user plane data in the control message.

27. The apparatus of claim 26, wherein the one or more parameters include one or more of a type, a size, or a logical channel related to the user plane data.

28. The apparatus of claim 24, wherein the U-RNTI indicating component populates a media access control (MAC)-i header logical channel identifier related to the control message with the U-RNTI.

29. A method, comprising:
  receiving a control message over provided common control resources;
  determining that the control message comprises user plane data;
  extracting a user equipment (UE) radio network temporary identifier (U-RNTI) from the control message; and
  transmitting the user plane data and the U-RNTI to one or more components on a wireless network for subsequent processing.

30. The method of claim 29, wherein the receiving the control message includes receiving a cell reselection or other message.

31. The method of claim 30, wherein the determining that the control message comprises user plane data includes determining that the cell reselection or other message includes one or more parameters related to the user plane data.

32. The method of claim 31, wherein the one or more parameters include one or more of a type, a size, or a logical channel related to the user plane data.

33. The method of claim 30, wherein the cell reselection or other message is a CELL UPDATE message.

34. The method of claim 29, wherein the determining that the control message comprises user plane data includes determining that a media access control (MAC)-i header related to the control message includes the U-RNTI.

35. The method of claim 29, further comprising receiving a response to the user plane data from a radio network controller (RNC) comprising the U-RNTI.

36. The method of claim 35, further comprising transmitting the response to a UE based at least in part on the U-RNTI.

37. A wireless communications apparatus, comprising:
  at least one processor configured to receive a control message from a user equipment (UE) over provided common control resources, determine that the control message comprises user plane data, extract a user equipment (UE) radio network temporary identifier (U-RNTI) related to the UE from the control message, and transmit the user plane data and the U-RNTI to one or more components on a wireless network for subsequent processing; and
  a memory coupled to the at least one processor.

38. The wireless communications apparatus of claim 37, wherein the control message is a cell reselection or other message.

39. The wireless communications apparatus of claim 38, wherein the user plane data is appended to the cell reselection or other message.

40. An apparatus, comprising:
  means for receiving a control message over provided common control resources;

means for determining that the control message comprises user plane data;
means for extracting a user equipment (UE) radio network temporary identifier (U-RNTI) from the control message; and
means for transmitting the user plane data and the U-RNTI to one or more components on a wireless network for subsequent processing.

41. The apparatus of claim 40, wherein the control message is a cell reselection or other message with the user plane data appended to the cell reselection or other message.

42. The apparatus of claim 40, wherein the means for determining that the control message comprises the user plane data obtains the user plane data based at least in part on one or more parameters in the control message.

43. The apparatus of claim 42, wherein the one or more parameters include one or more of a type, a size, or a logical channel related to the user plane data.

44. A non-transitory computer readable storage medium having computer-executable instructions recorded thereon, wherein executing the computer-executable instructions on a computer causes the computer to:
receive a control message over provided common control resources;
determine that the control message comprises user plane data;
extract a user equipment (UE) radio network temporary identifier (U-RNTI) from the control message; and
transmit the user plane data and the U-RNTI to one or more components on a wireless network for subsequent processing.

45. The computer readable storage medium of claim 44, wherein the computer-executable instructions that cause the computer to receive the control message further cause the computer to receive a cell reselection or other message.

46. The computer readable storage medium of claim 45, wherein the computer-executable instructions that cause the computer to determine that the control message comprises user plane data further cause the computer to determine that the cell reselection or other message includes one or more parameters related to the user plane data.

47. An apparatus, comprising:
a control data receiving component configured to receive a control message over provided common control resources;
a user plane determining component configured to determine that the control message comprises user plane data;
a user equipment (UE) radio network temporary identifier (U-RNTI) determining component configured to extract a U-RNTI from the control message; and
a backhaul link component configured to transmit the user plane data and the U-RNTI to one or more components on a wireless network for subsequent processing.

48. The apparatus of claim 47, wherein the control message is a cell reselection or other message with the user plane data appended to the cell reselection or other message.

49. The apparatus of claim 47, wherein the user plane determining component determines that the control message comprises the user plane data based at least in part on one or more parameters in the control message.

50. The apparatus of claim 49, wherein the one or more parameters include one or more of a type, a size, or a logical channel related to the user plane data.

51. A wireless communications apparatus, comprising:
at least one processor configured to receive user plane data for transmitting to a wireless network, generate a control message that includes at least the user plane data and a user equipment (UE) radio network temporary identifier (U-RNTI), and transmit the control message that includes the user plane data and the U-RNTI to the wireless network over common control resources provided by a Node B while in a universal terrestrial radio access network (UTRAN) registration area paging channel (URA_PCH) state; and
a memory coupled to the at least one processor.

52. An apparatus, comprising:
means for receiving user plane data for transmitting to a wireless network;
means for generating a control message that includes at least the user plane data and a user equipment (UE) radio network temporary identifier (U-RNTI); and
means for transmitting the control message that includes the user plane data and the U-RNTI to the wireless network over common control resources provided by a Node B while in a universal terrestrial radio access network (UTRAN) registration area paging channel (URA_PCH) state.

53. A non-transitory computer readable storage medium having computer-executable instructions recorded thereon, wherein executing the computer-executable instructions on a computer causes the computer to:
receive user plane data for transmitting to a wireless network;
generate a control message that includes at least the user plane data and a user equipment (UE) radio network temporary identifier (U-RNTI); and
transmit the control message that includes the user plane data and the U-RNTI to the wireless network over common control resources provided by a Node B while in a universal terrestrial radio access network (UTRAN) registration area paging channel (URA_PCH) state.

54. An apparatus, comprising:
a user plane data component configured to receive user plane data for transmitting to a wireless network;
a message generating component configured to generate a control message that includes at least the user plane data;
a user equipment (UE) radio network temporary identifier (U-RNTI) indicating component configured to specify a U-RNTI in the control message; and
a control channel communicating component configured to transmit the control message that includes the user plane data and the indicated U-RNTI to the wireless network over common control resources provided by a Node B while in a universal terrestrial radio access network (UTRAN) registration area paging channel (URA_PCH) state.

55. A method, comprising:
receiving a control message from a user equipment (UE) over provided common control resources while the UE is in a universal terrestrial radio access network (UTRAN) registration area paging channel (URA_PCH) state;
determining that the control message comprises user plane data;
extracting a UE radio network temporary identifier (U-RNTI) from the control message; and
transmitting the user plane data and the U-RNTI to one or more components on a wireless network for subsequent processing.

56. A wireless communications apparatus, comprising:
at least one processor configured to receive a control message from a user equipment (UE) over provided common control resources while the UE is in a universal terrestrial radio access network (UTRAN) registration area paging channel (URA_PCH) state, extract a UE radio network temporary identifier (U-RNTI) related to the UE from the control message, and transmit the user plane data and the U-RNTI to one or more components on a wireless network for subsequent processing; and
a memory coupled to the at least one processor.

57. An apparatus, comprising:
means for receiving a control message from a user equipment (UE) over provided common control resources while the UE is in a universal terrestrial radio access network (UTRAN) registration area paging channel (URA_PCH) state;
means for determining that the control message comprises user plane data;
means for extracting a UE radio network temporary identifier (U-RNTI) from the control message; and
means for transmitting the user plane data and the U-RNTI to one or more components on a wireless network for subsequent processing.

58. A non-transitory computer readable storage medium having computer-executable instructions recorded thereon, wherein executing the computer-executable instructions on a computer causes the computer to:
receive a control message from a user equipment (UE) over provided common control resources while the UE is in a universal terrestrial radio access network (UTRAN) registration area paging channel (URA_PCH) state;
determine that the control message comprises user plane data;
extract a UE radio network temporary identifier (U-RNTI) from the control message; and
transmit the user plane data and the U-RNTI to one or more components on a wireless network for subsequent processing.

59. An apparatus, comprising:
a control data receiving component configured to receive a control message from a user equipment (UE) over provided common control resources while the UE is in a universal terrestrial radio access network (UTRAN) registration area paging channel (URA_PCH) state;
a user plane determining component configured to determine that the control message comprises user plane data;
a UE radio network temporary identifier (U-RNTI) determining component configured to extract a U-RNTI from the control message; and
a backhaul link component configured to transmit the user plane data and the U-RNTI to one or more components on a wireless network for subsequent processing.

* * * * *